United States Patent
Yamada

(10) Patent No.: US 10,034,274 B2
(45) Date of Patent: Jul. 24, 2018

(54) MULTI-GROUP COMMUNICATION USING MULTIPLE CHANNELS OR CELLS

(71) Applicant: Sharp Kabushiki Kaisha, Osaka-shi, Osaka (JP)

(72) Inventor: Shohei Yamada, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 14/846,420

(22) Filed: Sep. 4, 2015

(65) Prior Publication Data

US 2015/0382345 A1 Dec. 31, 2015

Related U.S. Application Data

(60) Continuation of application No. 14/454,456, filed on Aug. 7, 2014, now Pat. No. 9,148,906, which is a
(Continued)

(51) Int. Cl.
*H04W 72/04* (2009.01)
*H04L 1/06* (2006.01)
(Continued)

(52) U.S. Cl.
CPC ....... *H04W 72/0413* (2013.01); *H04L 1/0618* (2013.01); *H04L 1/1861* (2013.01);
(Continued)

(58) Field of Classification Search
CPC ... H04L 1/0618; H04L 12/189; H04L 1/0026; H04L 12/0618; H04L 12/1671; H04W 76/002; H04W 56/0045; H04W 72/0413; H04W 74/0833; H04W 84/042; H04W 88/02
See application file for complete search history.

(56) References Cited

U.S. PATENT DOCUMENTS 8,837,304 B2 9/2014 Yamada
2011/0134774 A1* 6/2011 Pelletier .............. H04W 52/365
370/252

(Continued)

FOREIGN PATENT DOCUMENTS

WO 2010/124228 10/2010
WO 2010/148404 12/2010

(Continued)

OTHER PUBLICATIONS

NTT DoCoMo, Inc., "CA Support for Multi-TA," 3GPP TSG-RAN2#69, R2-101567, Feb. 2010.
(Continued)

*Primary Examiner* — Mewale Ambaye
(74) *Attorney, Agent, or Firm* — Austin Rapp

(57) ABSTRACT

A User Equipment (UE) configured for multi-group communications is described. The UE includes a processor and instructions stored in memory that is in electronic communication with the processor. The UE detects a plurality of cells. The UE also determines to use multiple groups of one or more cells. The UE further determines a primary secondary cell (PSCell) for a non-primary cell (non-PCell) group based on UE-specific radio resource control (RRC) signaling. The UE additionally receives information using the multiple groups.

8 Claims, 17 Drawing Sheets

Related U.S. Application Data division of application No. 13/083,456, filed on Apr. 8, 2011, now Pat. No. 8,837,304.

(51) Int. Cl.

| | | |
|---|---|---|
| *H04L 1/18* | (2006.01) | |
| *H04L 12/18* | (2006.01) | |
| *H04W 56/00* | (2009.01) | |
| *H04W 88/02* | (2009.01) | |
| *H04W 88/08* | (2009.01) | |
| *H04W 76/40* | (2018.01) | |
| *H04W 88/06* | (2009.01) | |
| *H04L 1/00* | (2006.01) | |
| *H04L 1/16* | (2006.01) | |
| *H04W 74/08* | (2009.01) | |
| *H04L 5/00* | (2006.01) | |
| *H04W 84/04* | (2009.01) | |

(52) U.S. Cl.
CPC ....... *H04L 12/189* (2013.01); *H04W 56/0045* (2013.01); *H04W 76/40* (2018.02); *H04W 88/02* (2013.01); *H04W 88/08* (2013.01); *H04L 1/0026* (2013.01); *H04L 1/1671* (2013.01); *H04L 5/001* (2013.01); *H04W 74/0833* (2013.01); *H04W 84/042* (2013.01); *H04W 88/06* (2013.01)

(56) References Cited

U.S. PATENT DOCUMENTS

| | | | |
|---|---|---|---|
| 2011/0170420 A1* | 7/2011 | Xi | H04L 5/001 370/241 |
| 2012/0008600 A1* | 1/2012 | Marinier | H04L 5/001 370/336 |
| 2012/0099491 A1* | 4/2012 | Lee | H04L 1/0015 370/280 |
| 2012/0106511 A1* | 5/2012 | Wu | H04W 76/064 370/331 |
| 2012/0214541 A1 | 8/2012 | Narashimha et al. | |
| 2012/0281628 A1* | 11/2012 | Park | H04J 11/0079 370/328 |
| 2012/0294694 A1 | 11/2012 | Garot | |
| 2014/0169346 A1* | 6/2014 | Futaki | H04J 11/0069 370/336 |
| 2014/0349713 A1 | 11/2014 | Yamada | |

FOREIGN PATENT DOCUMENTS

| | | |
|---|---|---|
| WO | 2011063244 A2 | 5/2011 |
| WO | 2011085200 A1 | 7/2011 |

OTHER PUBLICATIONS

TSG-RAN WG4, "Reply LS on RAN2 Status on Carrier Aggregation," 3GPP TSG RAN WG2 Meeting #67bis, R2-095422, Oct. 2009.
Ericsson, ST Ericsson, "Multiple Timing Advance for Carrier Aggregation," 3GPP TSG-RAN WG2 #67, R2-101196, Feb. 2010.
3GPP TS 36.300 V9.0.0, "Evolved Universal Terrestrial Radio Access (E-UTRA) and Evolved Universal Terrestrial Radio Access Network (E-UTRAN); Overall Description; Stage 2 (Release 9)," Jun. 2009.
3GPP TS 36.331 V9.1.0, "Evolved Universal Terrestrial Radio Access (E-UTRA) Radio Resource Control (RRC); Protocol specification (Release 9)," Dec. 2009.
3GPP TS 36.213 V8.6.0 "Evolved Universal Terrestrial Radio Access (E-UTRA) Physical layer procedures (Release 8)," Mar. 2009
3GPP TS 36.212 V9.0.0, "Evolved Universal Terrestrial Radio Access (E-UTRA); Multiplexing and Channel Coding (Release 9)," Dec. 2009.
3GPP TS 36.211 V9.0.0, "Evolved Universal Terrestrial Radio Access (E-UTRA); Physical Channels and Modulation (Release 9)," Dec. 2009.
3GPP TS 36.321 V9.1.0, "Evolved Universal Terrestrial Radio Access (E-UTRA) Medium Access Control (MAC) protocol specification (Release 9)," Dec. 2009.
Ericsson, ST-Ericsson, "Timing Alignment for CA," 3GPP TSG RAN WG1 Meeting #62, R1-104845, Aug. 2010.
Ericsson, ST Ericsson, "Multiple TA with a Single TAT," 3GPP TSG-RAN WG2 #74, R2-112984, May 2010.
International Search Report issued for International Patent Application No. PCT/JP2012/060085 dated Jul. 3, 2012.
Office Action issued for U.S. Appl. No. 13/083,456 dated Apr. 22, 2013.
Office Action issued for U.S. Appl. No. 13/083,456 dated Sep. 13, 2013.
Advisory Action issued for U.S. Appl. No. 13/083,456 dated Oct. 24, 2013.
Notice of Allowance issued for U.S. Appl. No. 13/083,456 dated May 14, 2014.
Office Action issued for U.S. Appl. No. 14/454,456 dated Jan. 5, 2015.
Notice of Allowance issued for U.S. Appl. No. 14/454,456 dated May 28, 2015.

* cited by examiner

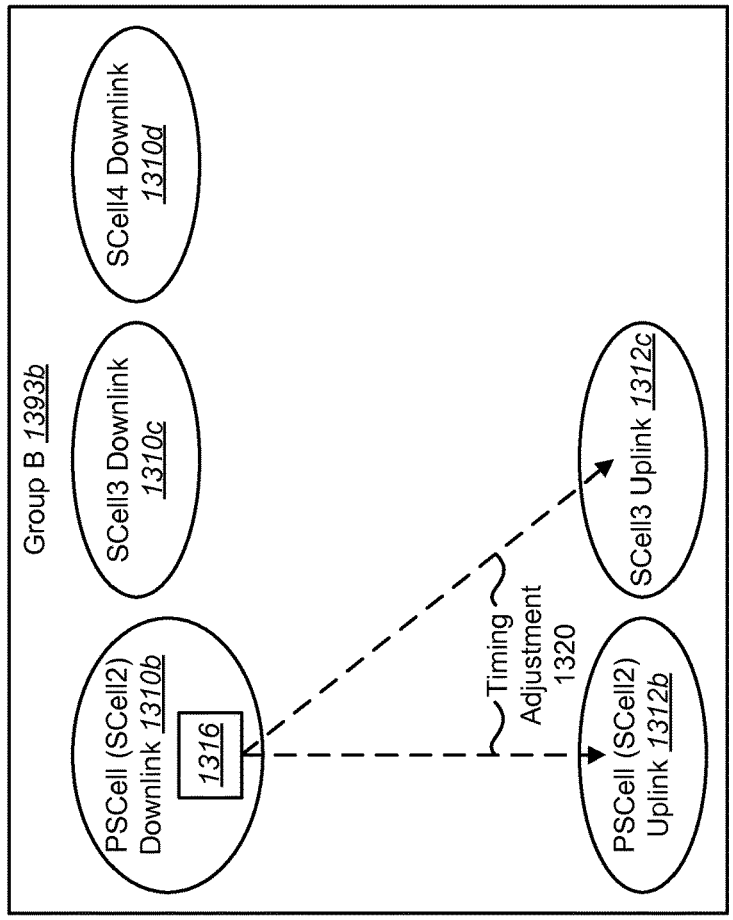
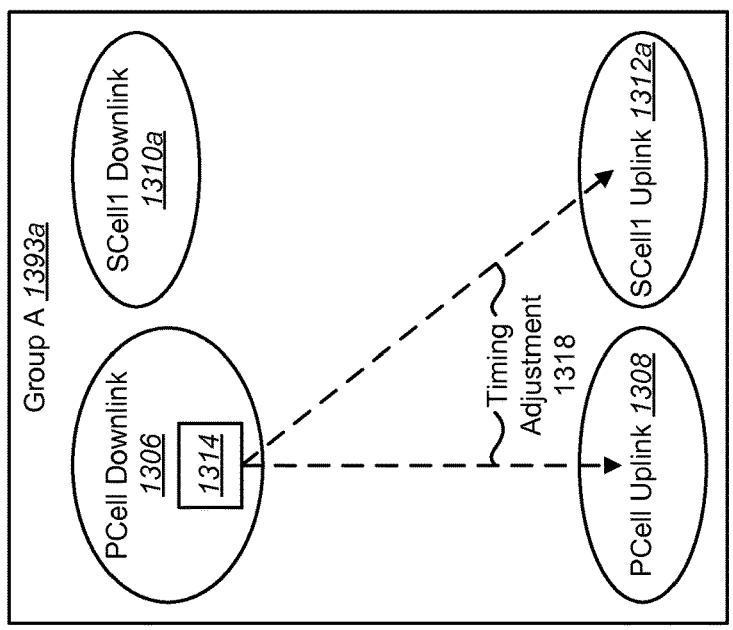
FIG. 13

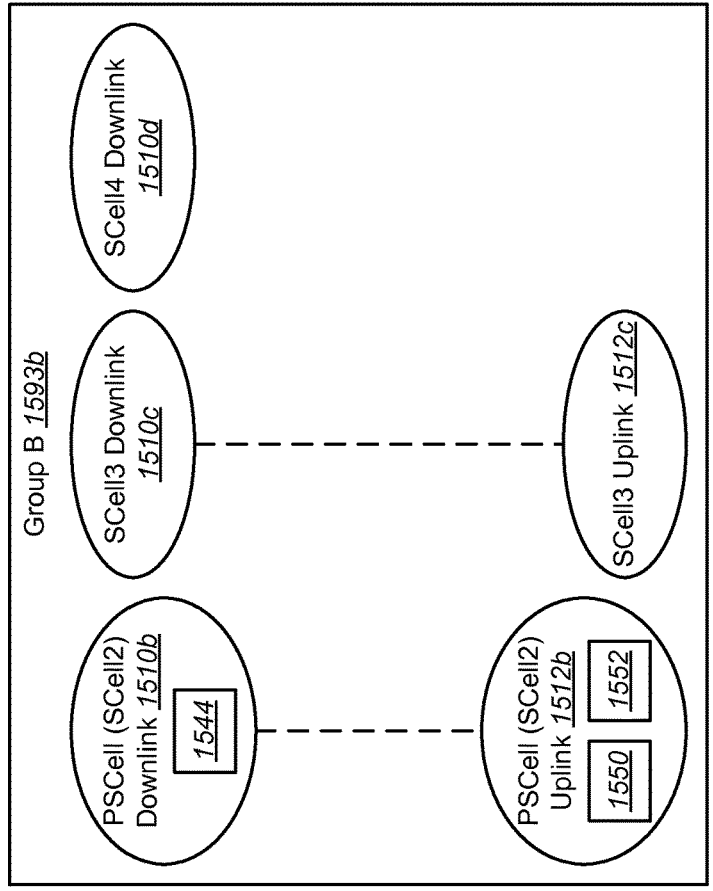
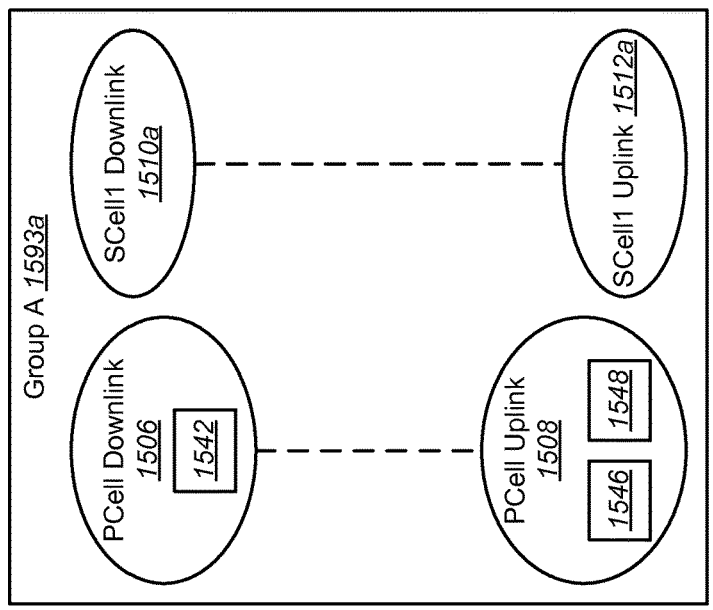
FIG. 15

MULTI-GROUP COMMUNICATION USING MULTIPLE CHANNELS OR CELLS

RELATED APPLICATIONS

This application is a continuation of U.S. patent application Ser. No. 14/454,456 entitled "DEVICES FOR MULTI-GROUP COMMUNICATIONS," filed Aug. 7, 2014, now issued as U.S. Pat. No. 9,148,906, which is a divisional of U.S. patent application Ser. No. 13/083,456 entitled "DEVICES FOR MULTI-GROUP COMMUNICATIONS," filed Apr. 8, 2011, now issued as U.S. Pat. No. 8,837,304, which are all hereby incorporated herein by reference in their entirety.

TECHNICAL FIELD

The present disclosure relates generally to communication systems. More specifically, the present disclosure relates to devices for multi-group communications.

BACKGROUND

Wireless communication devices have become smaller and more powerful in order to meet consumer needs and to improve portability and convenience. Consumers have become dependent upon wireless communication devices and have come to expect reliable service, expanded areas of coverage, and increased functionality. A wireless communication system may provide communication for a number of wireless communication devices, each of which may be serviced by a base station. A base station may be a fixed station that communicates with wireless communication devices.

As wireless communication devices have advanced, improvements in communication capacity, speed and/or quality have been sought. However, improvements in communication capacity, speed and/or quality may require increased resources.

For example, wireless communication devices may communicate with one or more devices using multiple channels or cells. However, communicating with one or more devices using multiple channels or cells may pose certain challenges. As illustrated by this discussion, systems and methods that enable or improve communication using multiple channels or cells may be beneficial.

BRIEF DESCRIPTION OF THE DRAWINGS

FIG. 13 is a diagram illustrating one example of uplink transmission timing adjustments in random access responses;

FIG. 15 is a diagram illustrating one example of common space monitoring in multiple groups;

DETAILED DESCRIPTION

Figure 1:
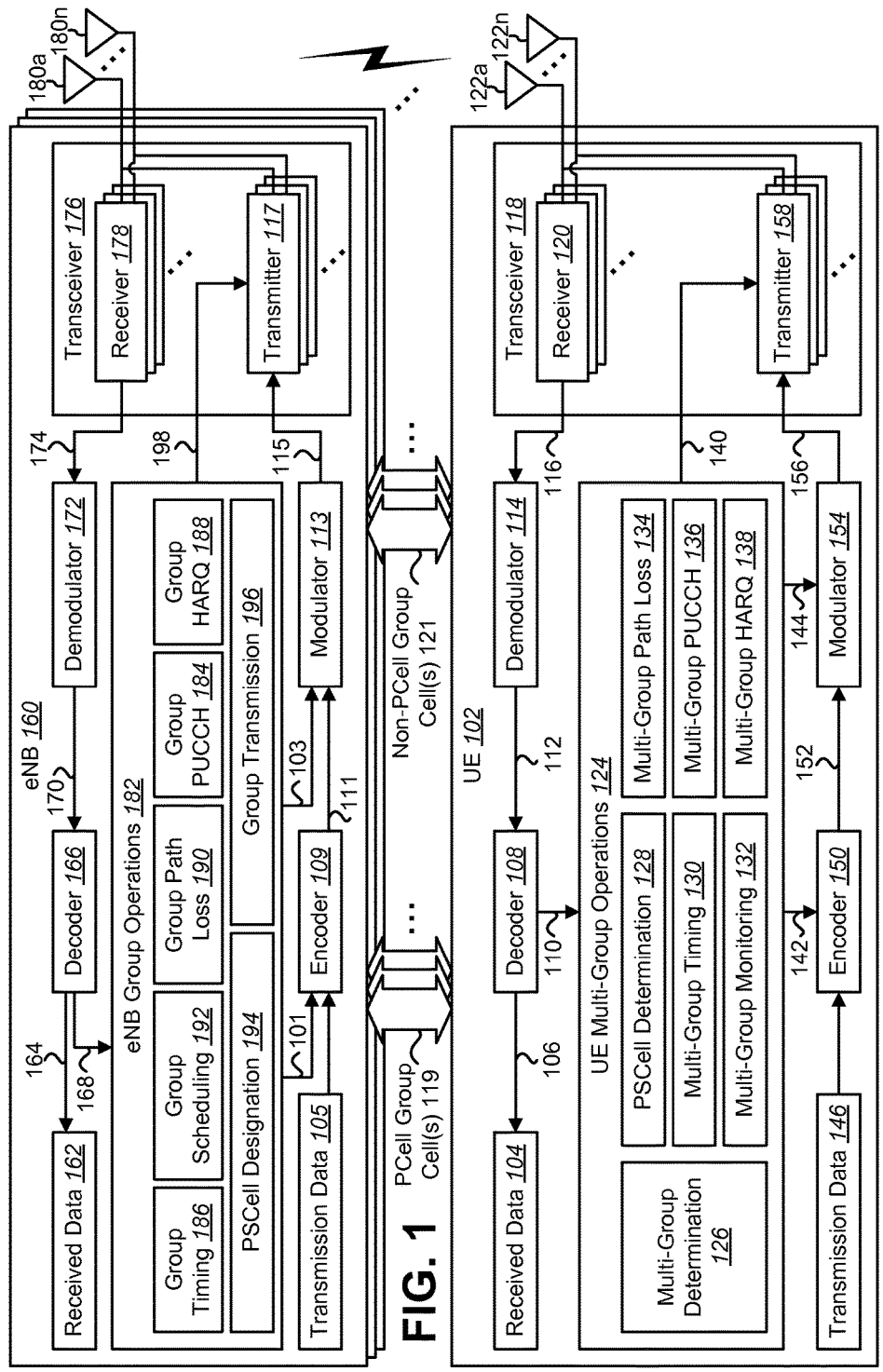
FIG. 1 is a block diagram illustrating one configuration of a user equipment (UE) and one or more evolved Node Bs (eNBs) in which systems and methods for multi-group communications may be implemented.

A User Equipment (UE) configured for multi-group communications is disclosed. The UE includes a processor and instructions stored in memory that is in electronic communication with the processor. The UE detects a plurality of cells. The UE also determines to use multiple groups of one or more cells. The UE further determines a primary secondary cell (PSCell) for a non-primary cell (non-PCell) group based on UE-specific radio resource control (RRC) signaling. The UE additionally receives information using the multiple groups. Determining the PSCell based on RRC signaling may include receiving a message that explicitly identifies the PSCell. Determining the PSCell based on RRC signaling may include determining the PSCell based on an SCell with a random access channel (RACH), an SCell with a lowest order in a group configuration or a reference cell for uplink timing.

The UE may also configure a physical uplink control channel (PUCCH) for one or more non-PCell groups. The UE may additionally determine whether to adjust timing for the non-PCell group and use a timing advance command to adjust the timing for the non-PCell group if it is determined to adjust timing for the non-PCell group.

The UE may further determine whether a path loss parameter is received that designates a reference cell in the non-PCell group. Furthermore, the UE may determine a path loss based on the reference cell if the path loss parameter is received that designates a reference cell in the non-PCell group and transmit a path loss indicator for the non-PCell group if the path loss parameter is received that designates a reference cell in the non-PCell group.

The UE may also transmit information indicating a multiple uplink time alignment capability. The UE may additionally monitor a common search space for each group. The UE may further transmit an acknowledgement or negative acknowledgement (ACK/NACK) for the non-PCell group.

An evolved Node B (eNB) configured for multi-group communications is also disclosed. The eNB includes a processor and instructions stored in memory that is in electronic communication with the processor. The eNB transmits radio resource control (RRC) signaling indicating a primary secondary cell (PSCell) for a non-primary cell (PCell) group. The eNB also transmits information using the non-PCell group.

The eNB may also allocate a physical uplink control channel (PUCCH) for one or more non-PCell groups. The eNB may additionally receive information indicating a user equipment (UE) multiple uplink time alignment capability. The eNB may also determine whether to adjust timing for the non-PCell group and transmit a timing advance command for the non-PCell group if it is determined to adjust timing for the non-PCell group. The eNB may also transmit a path loss parameter for one or more non-PCell groups and receive a path loss indicator. The eNB may additionally receive one or more acknowledgements or negative acknowledgements (ACK/NACKs) on the PSCell.

The RRC signaling indicating the PSCell may include a message that explicitly identifies the PSCell. The RRC signaling may indicate the PSCell based on one selected from the group consisting of an SCell with a random access channel (RACH), an SCell with a lowest order in a group configuration and an SCell that is a reference cell for uplink timing.

A method for multi-group communications on a User Equipment (UE) is also disclosed. The method includes detecting a plurality of cells. The method also includes determining to use multiple groups of one or more cells. The method additionally includes determining a primary secondary cell (PSCell) for a non-primary cell (non-PCell) group based on UE-specific radio resource control (RRC) signaling. The method further includes receiving information using the multiple groups.

A method for multi-group communications on an evolved Node B (eNB) is also disclosed. The method includes transmitting radio resource control (RRC) signaling indicating a primary secondary cell (PSCell) for a non-primary cell (PCell) group. The method also includes transmitting information using the non-PCell group.

The 3rd Generation Partnership Project, also referred to as "3GPP," is a collaboration agreement that aims to define globally applicable technical specifications and technical reports for third and fourth generation wireless communication systems. The 3GPP may define specifications for next generation mobile networks, systems, and devices.

3GPP Long Term Evolution (LTE) is the name given to a project to improve the Universal Mobile Telecommunications System (UMTS) mobile phone or device standard to cope with future requirements. In one aspect, UMTS has been modified to provide support and specification for the Evolved Universal Terrestrial Radio Access (E-UTRA) and Evolved Universal Terrestrial Radio Access Network (E-UTRAN).

At least some aspects of the systems and methods disclosed herein may be described in relation to the 3GPP LTE and LTE-Advanced (LTE-A) standards (e.g., Release-8 and Release-10). However, the scope of the present disclosure should not be limited in this regard. At least some aspects of the systems and methods disclosed herein may be utilized in other types of wireless communication systems.

A wireless communication device may be an electronic device used to communicate voice and/or data to a base station, which in turn may communicate with a network of devices (e.g., public switched telephone network (PSTN), the Internet, etc.). In describing systems and methods herein, a wireless communication device may alternatively be referred to as a mobile station, a User Equipment (UE), an access terminal, a subscriber station, a mobile terminal, a remote station, a user terminal, a terminal, a subscriber unit, a mobile device, etc. Examples of wireless communication devices include cellular phones, smart phones, personal digital assistants (PDAs), laptop computers, netbooks, e-readers, wireless modems, etc. In 3GPP specifications, a wireless communication device is typically referred to as a User Equipment (UE). However, as the scope of the present disclosure should not be limited to the 3GPP standards, the terms "UE" and "wireless communication device" may be used interchangeably herein to mean the more general term "wireless communication device."

In 3GPP specifications, a base station is typically referred to as a Node B, an evolved or enhanced Node B (eNB), a home enhanced or evolved Node B (HeNB) or some other similar terminology. As the scope of the disclosure should not be limited to 3GPP standards, the terms "base station," "Node B," "eNB," and "HeNB" may be used interchangeably herein to mean the more general term "base station." Furthermore, the term "base station" may be used to denote an access point. An access point may be an electronic device that provides access to a network (e.g., Local Area Network (LAN), the Internet, etc.) for wireless communication devices. The term "communication device" may be used to denote both a wireless communication device and/or a base station.

The term "synchronized" and variations thereof may be used herein to denote a situation where two or more events occur in overlapping time frames. In other words, two "synchronized" events may overlap in time to some extent, but are not necessarily of the same duration. Furthermore, synchronized events may or may not begin or end at the same time.

It should be noted that as used herein, a "cell" may be any communication channel that is specified by standardization or regulatory bodies to be used for International Mobile Telecommunications-Advanced (IMT-Advanced) and all of it or a subset of it may be adopted by 3GPP as licensed bands to be used for communication between a Node B (e.g., eNodeB) and a UE. "Configured cells" are those cells of which the UE is aware and is allowed by Node B (e.g., eNB) to transmit or receive information. "Configured cell(s)" may be serving cell(s). The UE may receive system information and perform the required measurements on all configured cells. "Activated cells" are those configured cells on which the UE is transmitting and receiving. That is, activated cells are those cells for which the UE monitors the PDCCH and in the case of a downlink transmission, those cells for which the UE decodes a Physical Downlink Shared Channel (PDCCH). "Deactivated cells" are those configured cells that the UE is not monitoring the transmission PDCCH.

The systems and methods disclosed herein may relate to how a user equipment (UE) behaves in case that the UE is configured for multiple timing alignment groups or multiple random access channels. In 3GPP LTE Release-10 (e.g., LTE-A or Advanced E-UTRAN), carrier aggregation is introduced. Furthermore, a primary cell (PCell) and one or more secondary cells (SCells) may be used.

If carrier aggregation is configured, a user equipment (UE) may have multiple serving cells: a primary cell (PCell) and one or more secondary cells (SCell). From a network perspective, the same serving cell may be used as the primary cell (PCell) by one user equipment (UE) and used as a secondary cell (SCell) by another user equipment (UE).

A primary cell (PCell) that is operating according to Release-8 or Release-9 may be equivalent to the Release-8 or Release-9 serving cell. When operating according to Release-10, there may be one or more secondary cells (SCell) in addition to the primary cell (PCell) if carrier aggregation is configured.

When carrier aggregation is configured, a user equipment (UE) may have only one Radio Resource Control (RRC) connection with the network. At the RRC connection establishment, re-establishment and/or handover, one serving cell (e.g., the primary cell (PCell)) may provide the non-access stratum (NAS) mobility information (e.g., Tracking Area Identity (TAI)) and the security input.

In the downlink, the carrier corresponding to the primary cell (PCell) is the downlink primary component carrier (DL PCC). In the uplink, the carrier corresponding to the primary cell (PCell) is the uplink primary component carrier (UL PCC). Depending on the capabilities of the user equipment (UE), one or more secondary component carriers (SCC) or secondary cells (SCell) may be configured to form a set of serving cells with the primary cell (PCell). In the downlink, the carrier corresponding to the secondary cell (SCell) is the downlink secondary component carrier (DL SCC). In the uplink, the carrier corresponding to the secondary cell (SCell) is the uplink secondary component carrier (UL SCC). The number of downlink component carriers may be different from the number of uplink component carriers because multiple cells may share one uplink component carrier.

The UE may adjust its uplink transmission timing for a physical uplink control channel (PUCCH), physical uplink shared channel (PUSCH) and/or sounding reference signal (SRS) of the primary cell based on a timing advance command. The timing advance command in a random access response may be transmitted from an eNB to a UE after the UE has sent a random access preamble. The timing advance command (which refers to a timing advance command media access control (MAC) control element) is also transmitted from the eNB to the UE at any time the eNB wants to change the UE's uplink transmission timing. The uplink transmission timing may need to be adjusted from time to time to account for changes in the radio frequency (RF) delay as the relative position of the UE changes in respect to a corresponding eNB. In this manner, the eNB may provide that all signals from any UEs to the eNB reach the eNB at the same time or within a cyclic prefix in an orthogonal frequency division multiplexing (OFDM) symbol.

In the case of a random access response, an 11-bit timing advance command $T_A$ may indicate $N_{TA}$ values by index values of $T_A=0, 1, 2, \ldots, 1282$, where an amount of the time alignment is given by $N_{TA}=T_A \times 16$.

In other cases, a six-bit timing advance command $T_A$ may indicate adjustment of a current $N_{TA}$ value (denoted $N_{TA,old}$) to a new $N_{TA}$ value (denoted $N_{TA,new}$) by index values of $T_A=0, 1, 2, \ldots, 63$, where $N_{TA,new}=N_{TA,old}+(T_A-31)\times 16$. In this case, adjustment of an $N_{TA}$ value by a positive or a negative amount indicates advancing or delaying the uplink transmission timing by a given amount, respectively.

Transmission of an uplink radio frame number i from the UE starts $N_{TA} \times T_s$ seconds before the start of a corresponding downlink radio frame at the UE, where $0 \leq N_{TA} \leq 20512$ and $$T_s = \frac{1}{(15000 \times 2048)}$$

seconds. In other words, a UE may begin transmitting an uplink radio frame i $N_{TA} \times T_s$ seconds before receiving a corresponding downlink radio frame i.

Typically, the uplink (UL) transmission timing for a physical uplink shared channel (PUSCH) and/or sounding reference signal (SRS) of a secondary cell may be the same as that of a primary cell. However, aggregation between cells may be introduced with different transmission and/or reception sites. In this case, a UE may need to have different uplink transmission timing for each cell.

In Release-11, this multiple uplink transmission timing adjustment is investigated. One example of a deployment scenario is that different component carriers could see substantially different propagation environments due to different frequency selective repeaters and hence see different time-of-flights. Another example deployment scenario is that the UE may communicate with two non-collocated sites on two carriers. Such a scenario could occur with remote antennas or remote radio heads.

Some approaches indicate that this issue can be solved by having multiple time alignment groups, though the detail of operation of multiple time alignment groups has not been described. However, if a UE has multiple transmission timing adjustments and the timing difference is relatively large, problems may occur with subframe timing and cross carrier scheduling, etc. For example, a physical uplink control channel (PUCCH) transmission or physical downlink control channel (PDCCH) transmission may not occur in time to prepare for data transmission.

One or more of the following aspects may be used in accordance with the systems and methods disclosed herein. In addition to a group of one or more serving cells (including a primary cell (PCell)), one or more groups that include at least one secondary cell (SCell) are introduced. The uplink transmissions corresponding to one or more serving cells in each group may have the same uplink transmission timing.

Each group may have one specific cell that is used as an uplink timing reference. In a group including the PCell, this specific cell may be the PCell. In a group that does not include the PCell, this specific cell may be a specific SCell referred to as a primary SCell (PSCell) or a secondary PCell (SPCell). In the specification and claims herein, the term "PSCell" is used to refer to a primary SCell (PSCell), a secondary PCell (SPCell) or both. The PSCell may have intermediate features between the PCell and the SCell.

PCell features may include the following. The PCell may be used as an anchor cell of Security and Mobility. The UE may be required to perform Radio Link Monitoring in the PCell. The PCell may be used as a path loss reference to other cell(s). The PCell may be used as an uplink timing reference to other cell(s). The PCell uplink timing may refer to the PCell downlink timing. The PCell may always be activated and never deactivated. The PCell may not be cross-carrier scheduled. The UE may acquire System Information and/or Paging transmitted from an eNB in the PCell. The UE may monitor a Random Access Response and/or physical downlink control channel (PDCCH) ordered random access channel (RACH) and/or Contention Resolution for random access in the PCell. The UE may be assigned a Semi-Persistent Scheduling resource in the PCell by the eNB. The UE may use a physical random access channel (PRACH) resource in the PCell. The UE may use a physical uplink control channel (PUCCH) resource in the PCell.

SCell features may include the following. The SCell may not be used as an anchor cell of Security and Mobility. The UE may not be required to perform Radio Link Monitoring in the SCell. The SCell may not be used as a path loss reference to other cell(s). The SCell may not be used as an uplink timing reference to other cell(s). The SCell may be activated or deactivated. The SCell may be cross-carrier scheduled. The UE may not acquire System Information and/or Paging transmitted from an eNB in the SCell. The UE may not monitor a Random Access Response and/or PDCCH ordered RACH and/or Contention Resolution for random access in the SCell. The UE may not be assigned a Semi-Persistent Scheduling resource in the SCell by the eNB. The UE may not be assigned a PRACH resource in the SCell. The UE may not be assigned a PUCCH resource in the SCell.

PSCell features may include one or more of the following, for example. The PSCell may not be used as an anchor cell of Security and Mobility. The UE may be required to perform Radio Link Monitoring in the PSCell. The PSCell may be used as a path loss reference to other cell(s) within its own group. The PSCell may be used as an uplink timing reference to other cell(s) within its own group. The PSCell uplink timing may refer to the PSCell downlink timing. The PCell may always be activated and may never be deactivated. The PSCell may not be cross-carrier scheduled. The UE may not acquire System Information and/or Paging transmitted from an eNB in the PSCell. The UE may monitor a Random Access Response and/or PDCCH ordered RACH and/or Contention Resolution for random access in the PSCell. The UE may not be assigned a Semi-Persistent Scheduling resource in the PSCell by an eNB. The UE may use a PRACH resource in the PSCell. The UE may use a PUCCH resource in the PSCell.

The uplink transmission timing for a PUSCH and/or SRS of an SCell in each group may be the same as the PCell in the same group or that of the PSCell in the same group. A PSCell may have a common search space in addition to a common search space in PCell.

A PSCell may not be cross-carrier scheduled. This means that other cells may not schedule a PSCell. On the other hand, a PSCell may schedule other cells.

A PSCell may be indicated by UE-specific explicit or implicit radio resource control (RRC) signaling. In one example of implicit signaling, an SCell that is configured with a random access channel may be the PSCell.

In the case that an SCell belongs to a group that does not include the PCell, a pathlossReference-r10(pCell, sCell) parameter may be replaced by a pathlossReference-r11 (psCell, sCell) parameter. A PSCell may have a PUCCH in addition to a PUCCH corresponding to the PCell. A hybrid automatic repeat request acknowledgement (HARQ-ACK) corresponding to cells in a group may be transmitted on the PSCell in the group.

More detail regarding various aspects of the systems and methods disclosed herein is given hereafter. In addition to a group of one or more serving cells that includes a primary cell (PCell)), one or more groups that include at least one secondary cell (SCell) are introduced. The uplink transmissions corresponding to one or more serving cells in each group may have the same uplink transmission timing.

Each group may have one specific cell that is used as an uplink timing reference. In a group including the PCell, this specific cell may be the PCell. In a group that does not include the PCell, this specific cell may be a specific SCell referred to as a primary SCell or PSCell.

The uplink transmission timing for a PUSCH and/or SRS of an SCell in each group may be the same as the uplink transmission timing for a corresponding PCell (that is in the same group, for example) or may be the same as the uplink transmission timing for a corresponding PSCell (that is in the same group, for example). This may be aligned with a multiple serving cell concept, which is that each serving cell has a downlink and may optionally have an uplink. Furthermore, each serving downlink carrier and uplink carrier may belong to one serving cell.

Uplink transmission timing may need to be adjusted since all signals from one or more UEs may need to reach the eNB at the same time or within a cyclic prefix in an OFDM symbol. In 3GPP Release-10, a UE uses the same transmission timing for all serving cells. In that case, there is no need to distinguish which cell or group of cells that the timing advance command corresponds to since there is only one group for aligning uplink transmission timing.

A timing advance command in a random access response may be transmitted from an eNB to a UE in a PCell or in a PSCell after the UE has sent a random access preamble in the PCell or the PSCell. This random access response may be scheduled by a PDCCH including a random access radio network temporary identifier (RA-RNTI), which is an identifier used for scheduling a PDSCH including a random access response.

Which PCell or SCell that a received random access response is for may be distinguished by which serving cell the random access response is scheduled in. For example, a UE may determine which cell (e.g., PCell, SCell, etc.) corresponds to a received random access response by determining which serving cell the random access response is scheduled in. A serving cell that the random access response is scheduled in may be determined by identifying a cell that has a HARQ entity, a PDCCH or a PDSCH for a random access response. The random access response scheduled in a PCell downlink (DL) may be used for an uplink (UL) transmission timing adjustment for a PCell uplink. The random access response scheduled in a PSCell downlink (DL) may be used for an uplink (UL) transmission timing adjustment for a PSCell uplink. It should also be noted that PDCCH detection to order a random access in a PSCell from an eNB to a UE may be in the PSCell and Contention resolution for a random access in a PSCell may be in the PSCell.

Another timing advance command (e.g., a timing advance command media access control (MAC) control element) may also be transmitted from the eNB to the UE at any time the eNB wants to change the UE's uplink transmission timing. Whether the received timing advance command is for the PCell or for a PSCell may be distinguished based on which serving cell the timing advance command is scheduled in. A serving cell that the timing advance command is scheduled in may be determined by identifying a cell that has a HARQ entity, a PDCCH or a PDSCH for a timing advance command. It should be noted that a timing advance command MAC control element (which may be transmitted from an eNB at any time) is different from a random access response. A timing advance command scheduled in any serving cell in a group that includes the PCell downlink may be used for an uplink transmission timing adjustment for the PCell uplink. A timing advance command scheduled in any serving cell(s) in the group that includes the PSCell downlink may be used for an uplink transmission timing adjustment for the PSCell uplink.

In another configuration, the timing advance command MAC control element or a MAC header of the timing advance command MAC control element may indicate which group the command corresponds to. A group indication may be a cell index of a PSCell that is included in the corresponding group.

Typically, there is only one common search space in a PCell and there is no common search space in an SCell. A UE may monitor a set of PDCCH candidates for control information on one or more activated serving cells as configured by higher layer signaling. More than one serving cell may be configured by RRC signaling and a serving cell may be activated or deactivated by MAC signaling.

The set of PDCCH candidates to monitor may be defined in terms of search spaces. There is a common search space on the primary cell and a UE-specific search space on the primary cell and/or the secondary cell. The common search space may be cell specific and only on the primary cell. The UE-specific search space may be defined by a cell radio network temporary identifier or C-RNTI (e.g., user equipment identifier (UEID)) and may be prepared for each serving cell.

Different kinds of information or data may be transmitted in the common search space. For example, a PDCCH to schedule system information or paging information, random access related information or normal UE data may be transmitted in the common search space. The physical layer of a UE may be configured by higher layers with a RNTI. The UE may decode the PDCCH with a cyclic redundancy check (CRC) scrambled by the RNTI. Downlink control information that is conveyed by PDCCH may have attached CRC. The CRC may be scrambled by the RNTI. For example, the CRC may be XORed with the RNTI. Some examples of the radio network temporary identifier (RNTI) include system information RNTI (SI-RNTI), paging RNTI (P-RNTI), cell RNTI (C-RNTI), random access RNTI (RA-RNTI), semi-persistent scheduling C-RNTI (SPS C-RNTI), temporary C-RNTI, transmit power control physical uplink control channel RNTI (TPC-PUCCH-RNTI) and transmit power control physical uplink shared channel RNTI (TPC-PUSCH-RNTI). In some cases, the UE may monitor the RNTI (if it is configured to be monitored, for example). The RA-RNTI and the temporary C-RNTI may be used for PDCCH random access-related scheduling information.

However, in order to have multiple time alignments, a UE may need to perform a random access procedure in a PSCell. Thus, a UE configured with an SCell with a random access channel may be required to monitor a PDCCH in the common search space in the PSCell in addition to the common search space in the PCell. There may be no need to monitor a SI-RNTI, a P-RNTI and an SPS C-RNTI in the PSCell, since it may be sufficient to monitor them in the common search space in the PCell. Therefore, the C-RNTI, RA-RNTI, temporary C-RNTI, TPC-PUCCH-RNTI and TPC-PUSCH-RNTI may be monitored by the UE in the common search space in a PSCell.

Currently, a PCell may not be cross-carrier scheduled. This means that a PDCCH of SCells may not schedule a PDSCH or PUSCH of the PCell. On the other hand, a PCell may schedule other cells. The reason for this is that the PCell may always be connected and the common search space of the PCell may need to be monitored by the UE anyway. It may be beneficial to use a similar concept regarding a PSCell. Also, the timing difference between groups may complicate cross-carrier scheduling. Therefore, the PSCell may not be cross-carrier scheduled. In other words, the PDCCH of SCells may not schedule a PDSCH or PUSCH of a PSCell. On the other hand, the PSCell may schedule other cells.

A PSCell may be indicated from an eNB to a UE by UE-specific explicit or implicit RRC signaling. In one example of implicit signaling, an SCell that is configured with a random access channel is a PSCell. In another example, a PSCell may be an SCell with a lowest order in a group configuration. In yet another example, an SCell configuration has a reference cell for uplink timing, which is the PSCell. For example, cells with a Cell Index #0, #1, #2, #3, #4 may be a PCell, SCell#1, SCell#2, SCell#3 and SCell#4, respectively. Continuing with the example, SCell#2 may have a Cell Index #1 as a reference cell for uplink timing which means SCell#1 is the PSCell for SCell#2. SCell#3 may have a Cell Index #0 as a reference cell for uplink timing or no reference cell parameter for uplink timing which means SCell#3 belongs to a group that includes the PCell.

In Release-10, each SCell may use a PCell or the SCell itself as a path loss reference cell, which may be configurable by RRC signaling. If an SCell uses a PCell as a path loss reference cell, this indicates a cross-carrier path loss reference. If an SCell uses the SCell as a path loss reference cell, this indicates a non-cross-carrier path loss reference. In other words, the PCell may be used as a path loss reference cell to other cell(s), but an SCell may not be used as a path loss reference cell to other cell(s). An RRC parameter "pathlossReference-r10" may be used that indicates which PCell or SCell is used as a reference for a path loss measurement for an SCell. This RRC parameter "pathlossReference-r10" (which may be transmitted from an eNB to the UE) may be included in each SCell configuration.

Using different uplink transmission timing among groups may mean that each group may have different path loss. It may not be useful to select between a PCell and an SCell if the group to which the SCell belongs does not include the PCell. If a UE is configured with multiple uplink time alignments, a "pathlossReference-r11" parameter may be used that indicates which PSCell or SCell is used as a reference for the path loss measurement for an SCell in each SCell configuration. In other words, The PSCell may be used as a path loss reference cell to other cell(s) within its own group. Therefore, the parameter "pathlossReference-r10 (pCell, sCell)" may be replaced by a "pathlossReference-r11(psCell, sCell)" parameter in the case that an SCell belongs to a group that does not include the PCell. In another configuration, a selection among a PCell, a PSCell and an SCell may be used (e.g., a "pathlossReference-r11(pCell, psCell, sCell)" parameter may be used). The pathlossReference-r11 parameter may be sent from an eNB to the UE.

A UE may need to have more than one transmitter in order to perform multiple uplink timing adjustments. In Release-10, carrier aggregation is built as agnostic to the UE transmitter implementation. However, an eNB may need to know whether a UE is capable of supporting multiple uplink time alignments. The UE may inform an eNB of its capability to support multiple uplink timing adjustments in a certain band combination and/or may inform an eNB of the maximum supportable number of uplink timing adjustments groups. In this way, an eNB may have some information regarding the transmitter implementation of a UE. Typically, a PUCCH may be allowed to be assigned only to a PCell because of uplink transmission power mitigation. However, if a UE is configured with multiple uplink time alignments, an eNB may allocate the PUCCH in a PSCell. A periodic channel quality indicator, precoding matrix indicator and/or rank indicator (CQI/PMI/RI) report on a PUCCH may be modified to be mapped to a PUCCH in a PSCell since their resources may be semi-statically assigned using an RRC message. It should be noted that the systems and methods disclosed herein may be applied to both frequency-division duplexing (FDD) systems and time-division duplexing (TDD) systems. Especially in a TDD system, each group may have a different uplink-downlink configuration that defines subframes for downlink and subframes for uplink. In a TDD system at least, it may be beneficial for each group to have a PUCCH.

A hybrid automatic repeat request acknowledgement (HARQ-ACK) (e.g., acknowledgements or negative acknowledgements (ACK/NACKs)) may also be mapped to a PUCCH in a PSCell. The HARQ-ACK may be generated based on each group of one or more serving cells. In other words, HARQ-ACK(s) corresponding to cells in a group may be transmitted on a PCell or a PSCell in the group. This approach may be beneficial because it may ease handling buffering issues due to the timing difference between groups since HARQ processes may be separated into each group.

Some other benefits of the systems and methods disclosed herein are that an eNB and a UE may operate well in a scenario where multiple uplink time alignment is needed. Another benefit of the systems and methods disclosed herein is that an eNB may allocate resources to a UE for multiple carriers with different physical timing. Yet another benefit of the systems and methods disclosed herein is that a UE and an eNB can be implemented simply. It should be noted that the systems and methods disclosed herein may be applicable to carrier aggregation between frequency-division duplex (FDD) systems or between time-division duplex (TDD) systems or even between an FDD system and a TDD system.

Transmission on multiple carrier components (also referred to as transmission on multiple cells, carrier aggregation, transmission on Primary Cell (PCell) and one or more Secondary Cells (SCells)) may be used in accordance with the systems and methods disclosed herein for uplink (UL) and/or downlink (DL) transmissions.

Various configurations are now described with reference to the Figures, where like reference numbers may indicate functionally similar elements. The systems and methods as generally described and illustrated in the Figures herein could be arranged and designed in a wide variety of different configurations. Thus, the following more detailed description of several configurations, as represented in the Figures, is not intended to limit scope, as claimed, but is merely representative of the systems and methods. As used herein the term "plurality" may indicate two or more. For example, a plurality of elements refers to two or more elements.

FIG. 1 is a block diagram illustrating one configuration of a user equipment (UE) 102 and one or more evolved Node Bs (eNBs) 160 in which systems and methods for multi-group communications may be implemented. The UE 102 communicates with an evolved Node B (eNB) 160 using one or more antennas 122*a-n*. For example, the UE 102 transmits electromagnetic signals to the eNB 160 and receives electromagnetic signals from the eNB 160 using the one or more antennas 122*a-n*. The eNB 160 communicates with the UE 102 using one or more antennas 180*a-n*. It should be noted that the eNB 160 may be a Node B, home evolved Node B (HeNB) or other kind of base station in some configurations.

The UE 102 and the eNB 160 may use one or more cells (e.g., channels, carrier components, etc.) 119, 121 to communicate with each other. For example, the UE 102 and eNB 160 may use the cells 119, 121 to carry one or more channels (e.g., Physical Uplink Control Channel (PUCCH), Physical Uplink Shared Channel (PUSCH), Physical Downlink Control Channel (PDCCH), etc.) A PUCCH is one example of a control channel pursuant to 3GPP specifications. Other kinds of channels may be used.

In accordance with the systems and methods disclosed herein, multiple kinds of cells 119, 121 and multiple groups of cells 119, 121 may be used for communication. As used herein, the term "group" may denote a group of one or more entities. A primary cell (PCell) may be a primary cell in accordance with 3GPP specifications. A secondary cell (SCell) may be a secondary cell in accordance with 3GPP specifications. A group of one or more cells that includes a PCell may be a PCell group. Cells in a PCell group may be referred to as PCell group cells 119. Thus, a PCell group includes at least a PCell. A PCell group may additionally include one or more SCells.

One or more other groups of cells that do not include a PCell may each be a "non-PCell" group. A non-PCell group may include one or more SCells. One or more cells in a non-PCell group may be referred to as non-PCell group cell(s) 121.

In one configuration, cells 119, 121 may be grouped according to site. More specifically, all cells 119, 121 transmitted from a particular site (e.g., eNB 160, repeater, etc.) may be grouped into a group. For example, a PCell group may be transmitted from a first site (e.g., an eNB 160 or repeater) while a non-PCell group may be transmitted from a second site (e.g., a separate remote radio head (RRH) or a separate repeater, etc.). For instance, a PCell group may be transmitted from a first eNB 160 at a first location, while a non-PCell group may be transmitted from a second remote radio head at a second location. A remote radio head (RRH) or repeater is may be a separate transmitter 117 and/or receiver 178, but multiple cells may still be provided by a single eNB 160. In another example, a PCell group may be transmitted from a first repeater at a first location, while a non-PCell group may be transmitted from a second repeater at a second location. In this case, the PCell group and the non-PCell group may be transmitted from the same site or from separate sites.

The UE 102 may include one or more transceivers 118, one or more demodulators 114, one or more decoders 108, one or more encoders 150, one or more modulators 154 and an UE multi-group operations module 124. For example, one or more reception and/or transmission paths may be used in the UE 102. For convenience, only a single transceiver 118, decoder 108, demodulator 114, encoder 150 and modulator 154 are illustrated, though multiple parallel elements 118, 108, 114, 150, 154 may be used depending on the configuration.

The transceiver 118 may include one or more receivers 120 and one or more transmitters 158. The one or more receivers 120 may receive signals from the eNB 160 using one or more antennas 122*a-n*. For example, the receiver 120 may receive and downconvert signals to produce one or more received signals 116. The one or more received signals 116 may be provided to a demodulator 114. The one or more transmitters 158 may transmit signals to the eNB 160 using one or more antennas 122*a-n*. For example, the one or more transmitters 158 may upconvert and transmit one or more modulated signals 156.

The demodulator 114 may demodulate the one or more received signals 116 to produce one or more demodulated signals 112. The one or more demodulated signals 112 may be provided to the decoder 108. The UE 102 may use the decoder 108 to decode signals. The decoder 108 may produce one or more decoded signals 106, 110. For example, a first UE-decoded signal 106 may comprise received payload data 104. A second UE-decoded signal 110 may comprise overhead data and/or control data. For example, the second UE-decoded signal 110 may provide data that may be used by the UE multi-group operations module 124 to perform one or more operations.

As used herein, the term "module" may mean that a particular element or component may be implemented in software or a combination of hardware and software. However, it should be noted that any element denoted as a "module" herein may alternatively be implemented in hardware. For example, the UE multi-group operations module 124 may be implemented in hardware, software or a combination of both.

In general, the UE multi-group operations module 124 may enable the UE 102 to communicate with one or more eNBs 160 using multiple groups of one or more cells 119, 121. The UE multi-group operations module 124 may include one or more of a multi-group determination module 126, a PSCell determination module 128, a multi-group timing module 130, a multi-group monitoring module 132, a multi-group path loss module 134, a multi-group PUCCH module 136 and a multi-group hybrid automatic repeat request (HARQ) module 138.

The multi-group determination module 126 may use received signal information (from the second UE decoded signal 110, for example) to determine whether the UE 102 may use multiple groups of one or more cells 119, 121 to communicate with one or more eNBs 160. For example, this determination may be based on signaling received from one or more eNBs 160 that was sent unilaterally or in response to a signal sent from the UE 102.

In one configuration, the UE 102 may detect a plurality of cells 119, 121. For example, the UE 102 may monitor one or more frequency bands to detect whether one or more eNBs 160 may provide access to cells 119, 121. For instance, the UE 102 may receive a broadcast, timing or beacon signal from one or more eNBs 160 indicating that the one or more eNBs 160 may provide cell(s) 119, 121 for communication. In another example, the UE 102 may transmit a signal or message (e.g., a search signal or message) to one or more eNBs 160. The one or more eNBs 160 may then send a signal in response to the UE 102 indicating that one or more cells 119, 121 may be used for communication.

The multi-group determination module 126 may use additional or alternative information to determine whether to use multiple groups of one or more cells 119, 121. For example, the UE 102 may determine whether to use multiple groups of cell(s) 119, 121 based on channel or cell 119, 121 quality, UE 102 capacity, battery life, type of use (e.g., streaming media, voice call, emergency, etc.) and/or other factors.

The multi-group determination module 126 may also notify one or more eNBs 160 of the UE's 102 multi-group communications capability. For example, A UE 102 may need to have more than one transmitter 158 in order to perform multiple uplink timing adjustments. In Release-10, carrier aggregation is built as agnostic to a UE transmitter implementation. However, an eNB 160 may need to know whether a UE 102 is capable of supporting multiple uplink time alignments. The UE 102 may inform an eNB 160 (e.g., send a message or signal to the eNB(s) 160) of its capability to support multiple uplink timing adjustments in a certain band combination and/or may inform an eNB of the maximum supportable number of uplink timing adjustments groups. In this way, an eNB 160 may have some information regarding the transmitter 158 implementation of a UE 102.

The primary secondary cell (PSCell) determination module 128 may determine a PSCell for one or more groups of non-PCell group cell(s) 121. For example, the UE 102 may communicate with one or more eNBs 160 using one or more non-PCell group cells 121 (e.g., groups of non-PCell group cell(s) 121). The non-PCell group cell(s) 121 may include one or more SCells. In some configurations, each non-PCell group may be transmitted via a different site (e.g., eNB 160, repeater, etc.). The PSCell determination module 128 may determine a primary secondary cell (PSCell) for each non-PCell group.

For example, the PSCell determination module 128 may determine one or more PSCells based on UE-specific (explicit or implicit) radio resource control (RRC) signaling. In one example of implicit signaling, an SCell (in a non-PCell group) that is configured with a random access channel (RACH) may be the PSCell for a corresponding non-PCell group. In another example, a PSCell may be an SCell (in a non-PCell group) with a lowest order in a group configuration. In yet another example, an SCell configuration has a reference cell for uplink timing, which is the PSCell. For example, cells with a Cell Index #0, #1, #2, #3, #4 may be a PCell, SCell#1, SCell#2, SCell#3 and SCell#4, respectively. Continuing with the example, SCell#2 may have a Cell Index #1 as a reference cell for uplink timing which means SCell#1 is the PSCell for SCell#2. SCell#3 may have a Cell Index #0 as a reference cell for uplink timing or no reference cell parameter for uplink timing which means SCell#3 belongs to a group that includes the PCell.

Alternatively, the PSCell determination module 128 may determine one or more PSCells based on UE-specific explicit RRC signaling. For example, one or more eNBs 160 may send a message to the UE 102 that explicitly identifies one or more PSCells (for one or more non-PCell groups).

The multi-group timing module 130 may control (e.g., adjust) the transmission timing for one or more groups. For example, the multi-group timing module 130 may adjust the transmission timing for one or more non-PCell groups. For instance, the multi-group timing module 130 may advance or delay the timing of non-PCell group signals transmitted from the UE 102 to one or more eNBs 160. The transmission timing may be different between the PCell group and one or more non-PCell groups. Additionally or alternatively, the transmission timing may be different between distinct non-PCell groups.

In one configuration, the UE 102 may adjust its uplink transmission timing for a physical uplink control channel (PUCCH), physical uplink shared channel (PUSCH) and/or sounding reference signal (SRS) of a primary cell (PCell) based on a timing advance command. The timing advance command in a random access response may be transmitted from an eNB 160 to the UE 102 after the UE 102 has sent a random access preamble. Another timing advance command (which refers to a timing advance command MAC element) may also be transmitted from an eNB 160 to the UE 102 at any time the eNB 160 wants to change the uplink transmission timing of the UE 102. The uplink transmission timing may need to be adjusted from time to time to account for changes in the RF delay as the relative position of the UE 102 changes in respect to a corresponding eNB 160. In this manner, the eNB 160 may provide that all signals from UEs to the eNB 160 reach the eNB 160 at the same time or within a cyclic prefix in an orthogonal frequency division multiplexing (OFDM) symbol.

In the case of a random access response, an 11-bit timing advance command $T_A$ may be used as described above. In other cases, a six-bit timing advance command $T_A$ may indicate adjustment of a current $N_{TA}$ value as described above.

Typically, the uplink transmission timing for a physical uplink shared channel (PUSCH) and/or sounding reference signal (SRS) of a secondary cell (SCell) may be the same as that of a primary cell (PCell). However, aggregation between cells may be introduced with different transmission and/or reception sites (e.g., different eNBs 160, RRHs or repeaters, etc.). In this case, the UE 102 may need to have different uplink transmission timing for each cell or groups of one or more cells. The multi-group timing module 130 may control or adjust the transmission timing for one or more groups (e.g., a PCell group and/or one or more non-PCell groups).

In one configuration, the uplink transmission timing for a PUSCH and/or SRS of each SCell 119 in a PCell group may be the same as the uplink transmission timing for the corresponding PCell. In accordance with the systems and methods disclosed herein, the uplink transmission timing for a PUSCH and/or SRS of each SCell 121 in a non-PCell group may be the same as the uplink transmission timing for a corresponding PSCell. It should be noted that each serving cell 119, 121 has a downlink and may optionally have an uplink. Furthermore, each serving downlink carrier and uplink carrier may belong to one serving cell 119, 121.

Uplink transmission timing may need to be adjusted since signals from the UE 102 may need to reach one or more eNBs 160 at one or more specified times. For example, all signals being transmitted to an eNB 160 may need to arrive at the same time or within a cyclic prefix in an OFDM symbol at the eNB 160. In 3GPP Release-10, a UE uses the same transmission timing for all serving cells. In that case, there is no need to distinguish which cell or group of cells that the timing advance command corresponds to since there is only one group for aligning uplink transmission timing.

A timing advance command in a random access response may be transmitted from an eNB 160 and received by the UE 102 in a PCell or in a PSCell after the UE 102 has sent a random access preamble in the PCell or the PSCell. This random access response may be scheduled by a PDCCH including a random access radio network temporary identifier (RA-RNTI), which is an identifier used for scheduling a PDSCH including a random access response.

The PCell or SCell that a received random access response is for may be distinguished by which serving cell 119, 121 the random access response is scheduled in. For example, the multi-group timing module 130 may determine which cell 119, 121 (e.g., PCell, SCell, etc.) corresponds to a received random access response by determining which serving cell the random access response is scheduled in. A serving cell that the random access response is scheduled in may be determined by identifying a cell 119, 121 that has a HARQ entity, a PDCCH or a PDSCH for a random access response.

In one configuration, the multi-group timing module 130 may thus determine which cell 119, 121 corresponds to a received random access response by identifying a cell 119, 121 that has a HARQ entity, a PDCCH or a PDSCH for a random access response. The random access response scheduled in a PCell downlink (DL) may be used for an uplink (UL) transmission timing adjustment for a PCell uplink. The random access response scheduled in a PSCell downlink (DL) may be used for an uplink (UL) transmission timing adjustment for a PSCell uplink. For example, the multi-group timing module 130 may advance or delay the timing of transmissions for one or more non-PCell group cells 121 (in one or more non-PCell groups) based on a corresponding timing advance command. In one configuration, the uplink transmission timing of SCells 121 in a non-PCell group may be adjusted to match the transmission timing of the PSCell in that group. It should also be noted that PDCCH detection to order a random access in a PSCell from an eNB to a UE may be in the PSCell and Contention resolution for a random access in a PSCell may be in the PSCell.

Another timing advance command (e.g., a timing advance command MAC control element) may be transmitted from an eNB 160 to the UE 102 at any time the eNB 160 wants to change the UE's 102 uplink transmission timing. Whether the received timing advance command is for the PCell or for a PSCell may be distinguished based on which serving cell 119, 121 the timing advance command is scheduled in. A serving cell 119, 121 that the timing advance command is scheduled in may be determined by identifying a cell that has a HARQ entity, a PDCCH or a PDSCH for a timing advance command. For example, the multi-group timing module 130 may determine which cell 119, 121 (e.g., PCell, PSCell, etc.) a timing advance command is for by identifying a cell that has a HARQ entity, a PDCCH or a PDSCH for a timing advance command.

A timing advance command scheduled in any serving cell in a group that includes the PCell downlink (e.g., PCell group) may be used for an uplink transmission timing adjustment for the PCell uplink. The transmission timing of any SCells in the PCell group may be matched to that of the PCell.

A timing advance command scheduled in any serving cell(s) in the group that includes the PSCell downlink (e.g., a non-PCell group) may be used for an uplink transmission timing adjustment for the PSCell uplink. For example, the multi-group timing module 130 may advance or delay the timing of transmissions for one or more non-PCell group cells 121 (in one or more non-PCell groups) based on a corresponding timing advance command. The transmission timing of any SCells 121 in a non-PCell group may be adjusted to match that of the corresponding PSCell.

In another configuration, the timing advance command MAC control element or a MAC header of the timing advance command MAC control element may indicate which group the command corresponds to. A group indication may be a cell index of a PSCell that is included in the corresponding group.

The multi-group monitoring module 132 may be used to monitor common search spaces for multiple groups. Typically, there is only one common search space in a PCell and there is no common search space in an SCell. However, in accordance with the systems and methods disclosed herein, one or more additional common search spaces may be used in one or more corresponding PSCell(s). The UE 102 may monitor a set of PDCCH candidates for control information on one or more activated serving cells 119, 121 as configured by higher layer signaling. More than one serving cell 119, 121 may be configured by RRC signaling and a serving cell may be activated or deactivated by MAC signaling.

The set of PDCCH candidates to monitor may be defined in terms of search spaces. Typically, there is a common search space on the primary cell (PCell) 119 and a UE-specific search space on the PCell 119 and/or one or more SCells. In this case, the common search space may be cell-specific and only on the PCell 119. The UE-specific search space may be defined by a cell radio network temporary identifier or C-RNTI (e.g., user equipment identifier (UEID)) and may be prepared for each serving cell 119, 121.

Typically, different kinds of information or data may be transmitted in a common search space. For example, a PDCCH to schedule system information or paging information, random access related information or normal UE 102 transmission data 146 may be transmitted in the common search space. The physical layer of a UE 102 may be configured by higher layers with a RNTI. The UE 102 may decode the PDCCH with a cyclic redundancy check (CRC) scrambled by the RNTI. Downlink control information that is conveyed by PDCCH may have attached CRC. The CRC may be scrambled by the RNTI. For example, the CRC may be XORed with the RNTI. Some examples of the radio network temporary identifier (RNTI) include system information RNTI (SI-RNTI), paging RNTI (P-RNTI), cell RNTI (C-RNTI), random access RNTI (RA-RNTI), semi-persistent scheduling C-RNTI (SPS C-RNTI), temporary C-RNTI, transmit power control physical uplink control channel RNTI (TPC-PUCCH-RNTI) and transmit power control physical uplink shared channel RNTI (TPC-PUSCH-RNTI). In some cases, the UE 102 may monitor the RNTI (if it is configured to be monitored, for example). The RA-RNTI and the temporary C-RNTI may be used for PDCCH random access-related scheduling information.

However, in accordance with the systems and methods disclosed herein and in order to have multiple time alignments, the UE 102 may need to perform a random access procedure in a PSCell 121. Thus, a UE 102 configured with an SCell with a random access channel (RACH) may be required to monitor a PDCCH in a common search space in the PSCell 121 in addition to the common search space in the PCell 119. There may be no need to monitor a SI-RNTI, a P-RNTI and an SPS C-RNTI in the PSCell 121, since it may be sufficient to monitor them in the common search space in the PCell 119. Therefore, the C-RNTI, RA-RNTI, temporary C-RNTI, TPC-PUCCH-RNTI and TPC-PUSCH-RNTI may be monitored by the multi-group monitoring module 132 in the common search space in a PSCell 121.

The multi-group path loss module 134 may be used to produce one or more path loss indicators for one or more non-PCell groups. In one configuration, the multi-group path loss module 134 may additionally be used to produce a path loss indicator for a PCell group. For example, in the case that an SCell 121 belongs to a non-PCell group, the multi-group path loss module 134 may produce a path loss indicator corresponding to a designated cell 121. A cell 121 used to measure the path loss may be designated by a "pathlossReference-r11(psCell, sCell)" parameter instead of a typical path loss parameter "pathlossReference-r10(pCell, sCell)".

In Release-10, for example, each SCell may use a PCell or the SCell itself as a path loss reference cell, which may be configurable by RRC signaling. If an SCell uses a PCell as a path loss reference cell, this indicates a cross-carrier path loss reference. If an SCell uses the SCell as a path loss reference cell, this indicates a non-cross-carrier path loss reference. In other words, the PCell may be used as a path loss reference cell to other cell(s), but an SCell may not be used as a path loss reference cell to other cell(s). An RRC parameter "pathlossReference-r10" may be used that indicates which PCell or SCell is used as a reference for a path loss measurement for an SCell in each SCell configuration. This RRC parameter "pathlossReference-r10" (which may be transmitted from an eNB to the UE) may be included in each SCell configuration. However, in accordance with the systems and methods disclosed herein, using different uplink transmission timing among groups may mean that each group may have a different path loss. It may not be useful to select between a PCell 119 and an SCell 121 if the group to which the SCell 121 belongs does not include the PCell 119. If the UE 102 is configured with multiple uplink time alignments, a "pathlossReference-r11" parameter may be used that indicates which PSCell 121 or SCell 121 is used as a reference for the path loss measurement for an SCell 121 in each SCell configuration. Therefore, the typical parameter "pathlossReference-r10(pCell, sCell)" may be replaced by a "pathlossReference-r11(psCell, sCell)" parameter in the case that an SCell 121 belongs to a non-PCell group. In another configuration, a selection among a PCell, a PSCell and an SCell may be used (e.g., a "pathlossReference-r11 (pCell, psCell, sCell)" parameter may be used). The pathlossReference-r11 parameter may be sent from an eNB to the UE.

The multi-group PUCCH module 136 may configure one or more PUCCHs corresponding to one or more non-PCell groups. For example, a PSCell 121 may have a PUCCH in addition to a PUCCH corresponding to the PCell 119. Typically, a PUCCH may be allowed to be assigned only to a PCell 119 because of uplink transmission power mitigation. However, if the UE 102 is configured with multiple uplink time alignments, an eNB 160 may allocate the PUCCH in a PSCell 121. A periodic channel quality indicator, precoding matrix indicator and/or rank indicator (CQI/PMI/RI) report on a PUCCH may be modified to be mapped to a PUCCH in a PSCell 121 since their resources may be semi-statically assigned using an RRC message.

The multi-group HARQ module 138 may generate one or more ACK/NACKs for one or more non-PCell groups. For example, a hybrid automatic repeat request acknowledgement (HARQ-ACK) corresponding to non-PCell group cells 121 in a group may be transmitted on the PSCell 121 in the group.

A hybrid automatic repeat request acknowledgement (HARQ-ACK) may optionally be mapped to a PUCCH in a PSCell 121. The HARQ-ACK may be generated based on each group of one or more serving cells 121. In some configurations, HARQ-ACK(s) corresponding to cells 119, 121 in a group may be transmitted on a PCell 119 or a PSCell 121 in the group. This approach may ease handling buffering issues due to the timing difference between groups since HARQ processes may be separated into each group.

The UE multi-group operations module 124 may provide information 142 to the encoder 150. This information 142 may include instructions for the encoder 150 and/or data to be encoded. For example, the UE multi-group operations module 124 may instruct the encoder 150 to shift transmission timing, instruct the encoder 150 regarding an encoding rate and/or type for one or more non-PCell groups and/or instruct the encoder 150 regarding transmission data 146 mapping to one or more non-PCell PUCCHs. Additionally or alternatively, the information 142 may include data to be encoded, such as a message indicating a UE 102 multi-group capability, ACK/NACKs for one or more non-PCell groups and/or one or more path loss indicators for one or more non-PCell groups.

The encoder 150 may encode transmission data 146 and/or other information 142 provided by the UE multi-group operations module 124. For example, encoding the data 146 and/or other information 142 may involve error detection and/or correction coding, mapping data to space, time and/or frequency resources (e.g., space-time block coding (STBC)) for transmission, etc. The encoder 150 may provide encoded data 152 to the modulator 154.

The UE multi-group operations module 124 may provide information 144 to the modulator 154. This information 144 may include instructions for the modulator 154. For example, the UE multi-group operations module 124 may instruct the modulator 154 to shift transmission timing and/or instruct the modulator 154 regarding a modulation type (e.g., constellation mapping) for one or more non-PCell groups. The modulator 154 may modulate the encoded data 152 to provide one or more modulated signals 156 to the one or more transmitters 158.

The UE multi-group operations module 124 may provide information 140 to the one or more transmitters 158. This information 140 may include instructions for the one or more transmitters 158. For example, the UE multi-group operations module 124 may instruct the one or more transmitters 158 to shift transmission timing for one or more non-PCell groups. The one or more transmitters 158 may upconvert and transmit the modulated signal(s) 156 to one or more eNBs 160. It should be noted that the UE 102 may need to have more than one transmitter 158 in order to perform multiple uplink timing adjustments.

Each of the one or more eNBs 160 may include one or more transceivers 176, one or more demodulators 172, one or more decoders 166, one or more encoders 109, one or more modulators 113 and an eNB group operations module 182. For example, one or more reception and/or transmission paths may be used in an eNB 160. For convenience, only a single transceiver 176, decoder 166, demodulator 172, encoder 109 and modulator 113 are illustrated, though multiple parallel elements 176, 166, 172, 109, 113 may be used depending on the configuration.

The transceiver 176 may include one or more receivers 178 and one or more transmitters 117. The one or more receivers 178 may receive signals from the UE 102 using one or more antennas 180*a-n*. For example, the receiver 178 may receive and downconvert signals to produce one or more received signals 174. The one or more received signals 174 may be provided to a demodulator 172. The one or more transmitters 117 may transmit signals to the UE 102 using one or more antennas 180*a-n*. For example, the one or more transmitters 117 may upconvert and transmit one or more modulated signals 115.

The demodulator 172 may demodulate the one or more received signals 174 to produce one or more demodulated signals 170. The one or more demodulated signals 170 may be provided to the decoder 166. The eNB 160 may use the decoder 166 to decode signals. The decoder 166 may produce one or more decoded signals 164, 168. For example, a first eNB-decoded signal 164 may comprise received payload data 162. A second eNB-decoded signal 168 may comprise overhead data and/or control data. For example, the second UE-decoded signal 168 may provide data that may be used by the eNB group operations module 182 to perform one or more operations.

In general, the eNB group operations module 182 may enable the eNB 160 to communicate with a UE 102 that is using multiple groups of one or more cells 119, 121. The eNB group operations module 182 may include one or more of a group transmission module 196, a PSCell designation module 194, a group timing module 186, a group scheduling module 192, a group path loss module 190, a group PUCCH module 184 and a multi-group hybrid automatic repeat request (HARQ) module 188.

The group transmission module 196 may determine a group transmission capability of the UE 102. For example, the group transmission module 196 may use received signal information (from the second UE decoded signal 168, for example) to determine whether the UE 102 may use multiple groups of one or more cells 119, 121 to communicate with one or more eNBs 160. As described above, the UE 102 may need to have multiple transmitters 158 to use multiple transmission timing alignments. The received signal information may indicate whether the UE 102 is capable of multiple timing adjustments (in a certain band combination) and/or may indicate a maximum supportable number of uplink timing adjustments groups, for instance. This determination may be based on signaling received from the UE 102 that was sent unilaterally or in response to a signal sent from the eNB 160.

The primary secondary cell (PSCell) designation module 194 may designate a PSCell for one or more groups of non-PCell group cell(s) 121. For example, the eNB 160 may communicate with the UE 102 using one or more non-PCell group cells 121. The non-PCell group cell(s) 121 may include one or more SCells. The eNB 160 may communicate using one or more non-PCell groups (e.g., groups of non-PCell group cell(s) 121). In some configurations, each non-PCell group may be transmitted via a different site (e.g., RRH, repeater, etc.). The PSCell designation module 194 may generate and/or send a message to the UE designating a primary secondary cell (PSCell) for one or more non-PCell groups.

For example, the PSCell designation module 194 may designate one or more PSCells using UE-specific (explicit or implicit) radio resource control (RRC) signaling. In one example of implicit signaling, an SCell (in a non-PCell group) that is configured with a random access channel (RACH) may be the PSCell for a corresponding non-PCell group. In another example, a PSCell may be an SCell (in a non-PCell group) with a lowest order in a group configuration. In yet another example, an SCell configuration has a reference cell for uplink timing, which is the PSCell. For example, cells with a Cell Index #0, #1, #2, #3, #4 may be a PCell, SCell#1, SCell#2, SCell#3 and SCell#4, respectively. Continuing with the example, SCell#2 may have a Cell Index #1 as a reference cell for uplink timing which means SCell#1 is the PSCell for SCell#2. SCell#3 may have a Cell Index #0 as a reference cell for uplink timing or no reference cell parameter for uplink timing which means SCell#3 belongs to a group that includes the PCell.

Alternatively, the PSCell designation module 194 may designate one or more PSCells using UE-specific explicit RRC signaling. For example, the eNB 160 may send a message to the UE 102 that explicitly identifies one or more PSCells (for one or more non-PCell groups).

The group timing module 186 may manage the transmission timing for one or more groups. For example, the group timing module 186 may send a timing adjustment message (e.g., timing advance command) to the UE 102 to adjust the transmission timing for one or more non-PCell groups. For instance, the UE 102 may advance or delay the timing of non-PCell group signals transmitted from the UE 102 corresponding to an eNB 160 based on one or more timing advance commands sent from the eNB 160. The transmission timing may be different between the PCell group and one or more non-PCell groups. Additionally or alternatively, the transmission timing may be different between distinct non-PCell groups.

In one configuration, the UE 102 may adjust its uplink transmission timing for a physical uplink control channel (PUCCH), physical uplink shared channel (PUSCH) and/or sounding reference signal (SRS) of a primary cell (PCell) based on a timing advance command (e.g., message) from an eNB 160. The timing advance command in a random access response may be transmitted from an eNB 160 to the UE 102 after the UE 102 has sent a random access preamble (to the eNB 160). Another timing advance command (which refers to a timing advance command MAC element) is also transmitted from an eNB 160 to the UE 102 at any time the eNB 160 wants to change the uplink transmission timing of the UE 102. The uplink transmission timing may need to be adjusted from time to time to account for changes in the RF delay as the relative position of the UE 102 changes in respect to a corresponding eNB 160. In this manner, the eNB 160 may provide that all signals from UEs to the eNB 160 reach the eNB 160 at the same time or within a cyclic prefix in an orthogonal frequency division multiplexing (OFDM) symbol.

In the case of a random access response, an 11-bit timing advance command $T_A$ may be sent from the eNB 160 as described above. In other cases, a six-bit timing advance command $T_A$ may be sent from the eNB 160 and may indicate adjustment of a current $N_{TA}$ value as described above.

Typically, the uplink transmission timing for a physical uplink shared channel (PUSCH) and/or sounding reference signal (SRS) of a secondary cell (SCell) may be the same as that of a primary cell (PCell). However, aggregation between cells may be introduced with different transmission and/or reception sites (e.g., different eNBs, RRHs or repeaters, etc.). In this case, the eNB 160 may need to have different uplink transmission timing for each cell or groups of one or more cells. The group timing module 186 may generate and send commands to control or adjust the transmission timing for one or more groups (e.g., a PCell group and/or one or more non-PCell groups).

A timing advance command in a random access response may be transmitted from an eNB 160 and received by the UE 102 in a PCell or in a PSCell after the UE 102 has sent a random access preamble in the PCell or the PSCell. This random access response may be scheduled by a PDCCH including a random access radio network temporary identifier (RA-RNTI), which is an identifier used for scheduling a PDSCH including a random access response. The PCell or SCell that a random access response is for may be indicated by which serving cell 119, 121 the random access response is scheduled in. A serving cell that the random access response is scheduled in may be indicated by a cell 119, 121 that has a HARQ entity, a PDCCH or a PDSCH for a random access response.

Another timing advance command (e.g., a timing advance command MAC element) may be transmitted from an eNB 160 to the UE 102 at any time an eNB 160 wants to change the UE's 102 uplink transmission timing. Whether the received timing advance command is for the PCell or for a PSCell may be indicated based on which serving cell 119, 121 the timing advance command is scheduled in. For example, which cell 119, 121 (e.g., PCell, PSCell, etc.) a timing advance command is for may be indicated by a cell that has a HARQ entity, a PDCCH or a PDSCH for a timing advance command.

In some configurations, the eNB 160 may use a timing advance command MAC control element or a MAC header of the timing advance command MAC control element that may indicate which group the command corresponds to. A group indication may be a cell index of a PSCell that is included in the corresponding group.

The group scheduling module 192 may be used to schedule communications for one or more groups of cells 119, 121. For example, the group scheduling block/module 192 may allocate communication resources to the UE 102 by sending a random access response to the UE 102. As noted above, a random access response may also include a timing advance command as generated by the group timing module 186. In some instances, scheduling information may be sent to the UE 102 using a PDCCH.

For example, a PDCCH to schedule system information or paging information may be transmitted by an eNB 160. The physical layer of a UE 102 may be configured by higher layers with a RNTI. Downlink control information that is conveyed by PDCCH may have attached CRC. The eNB 160 may scramble the CRC using the RNTI. For example, the CRC may be XORed with the RNTI. The RA-RNTI and the temporary C-RNTI may be used for PDCCH random access-related scheduling information. As described above, a PSCell may not be cross-carrier scheduled, but may schedule one or more SCells.

The group path loss module 190 may be used to manage one or more path loss parameters for one or more non-PCell groups. For example, in the case that an SCell 121 belongs to a non-PCell group, the group path loss module 190 may generate a path loss parameter (e.g., pathlossReference-r11 (psCell, sCell)) in order to designate a non-PCell group cell 121 as a path loss reference instead of a typical path loss parameter (e.g., pathlossReference-r10(pCell, sCell)). The path loss parameter may designate a cell used by a UE 102 to measure a path loss.

The group PUCCH module 184 may be used to allocate one or more PUCCHs corresponding to one or more non-PCell groups. For example, a PSCell 121 may have a PUCCH in addition to a PUCCH corresponding to the PCell 119. Typically, a PUCCH may be allowed to be assigned only to a PCell 119 because of uplink transmission power mitigation. However, if the UE 102 is configured with multiple uplink time alignments, an eNB 160 may allocate the PUCCH in a PSCell 121.

The group HARQ module 188 may receive one or more ACK/NACKs for one or more non-PCell groups. An eNB 160 may use the one or more ACK/NACKs to retransmit information that was not correctly received by the UE 102. ACK/NACKs corresponding to non-PCell group cells 121 in a group may be received by the eNB 160 on the PSCell 121 in the group. ACK/NACK(s) may optionally be mapped to a PUCCH in a PSCell 121. In some configurations, HARQ-ACK(s) corresponding to cells 119, 121 in a group may be received on a PCell 119 or a PSCell 121 in the group. This approach may be beneficial, since it may ease handling buffering issues due to the timing difference between groups since HARQ processes may be separated into each group.

The eNB group operations module 182 may provide information 101 to the encoder 109. This information 101 may include instructions for the encoder 109 and/or data to be encoded. For example, the eNB group operations module 182 may instruct the encoder 109 regarding an encoding rate and/or type for one or more non-PCell groups and/or instruct the encoder 109 regarding transmission data 105 mapping to one or more non-PCell PUCCHs. Additionally or alternatively, the information 101 may include data to be encoded, such as a message indicating a timing advance command, scheduling information, channel allocations and/or other control information.

The encoder 109 may encode transmission data 105 and/or other information 101 provided by the eNB group operations module 182. For example, encoding the data 105 and/or other information 101 may involve error detection and/or correction coding, mapping data to space, time and/or frequency resources (e.g., space-time block coding (STBC)) for transmission, etc. The encoder 109 may provide encoded data 111 to the modulator 113. The transmission data 105 may include network data to be relayed to the UE 102.

The eNB group operations module 182 may provide information 103 to the modulator 113. This information 103 may include instructions for the modulator 113. For example, the eNB group operations module 182 may instruct the modulator 113 regarding a modulation type (e.g., constellation mapping) for one or more non-PCell groups. The modulator 113 may modulate the encoded data 111 to provide one or more modulated signals 115 to the one or more transmitters 117.

The eNB group operations module 182 may provide information 198 to the one or more transmitters 117. This information 198 may include instructions for the one or more transmitters 117. For example, the eNB group operations module 182 may instruct the one or more transmitters 117 to form one or more non-PCell group cell(s) 121. The one or more transmitters 117 may upconvert and transmit the modulated signal(s) 115 to the UE 102.

Figure 2:
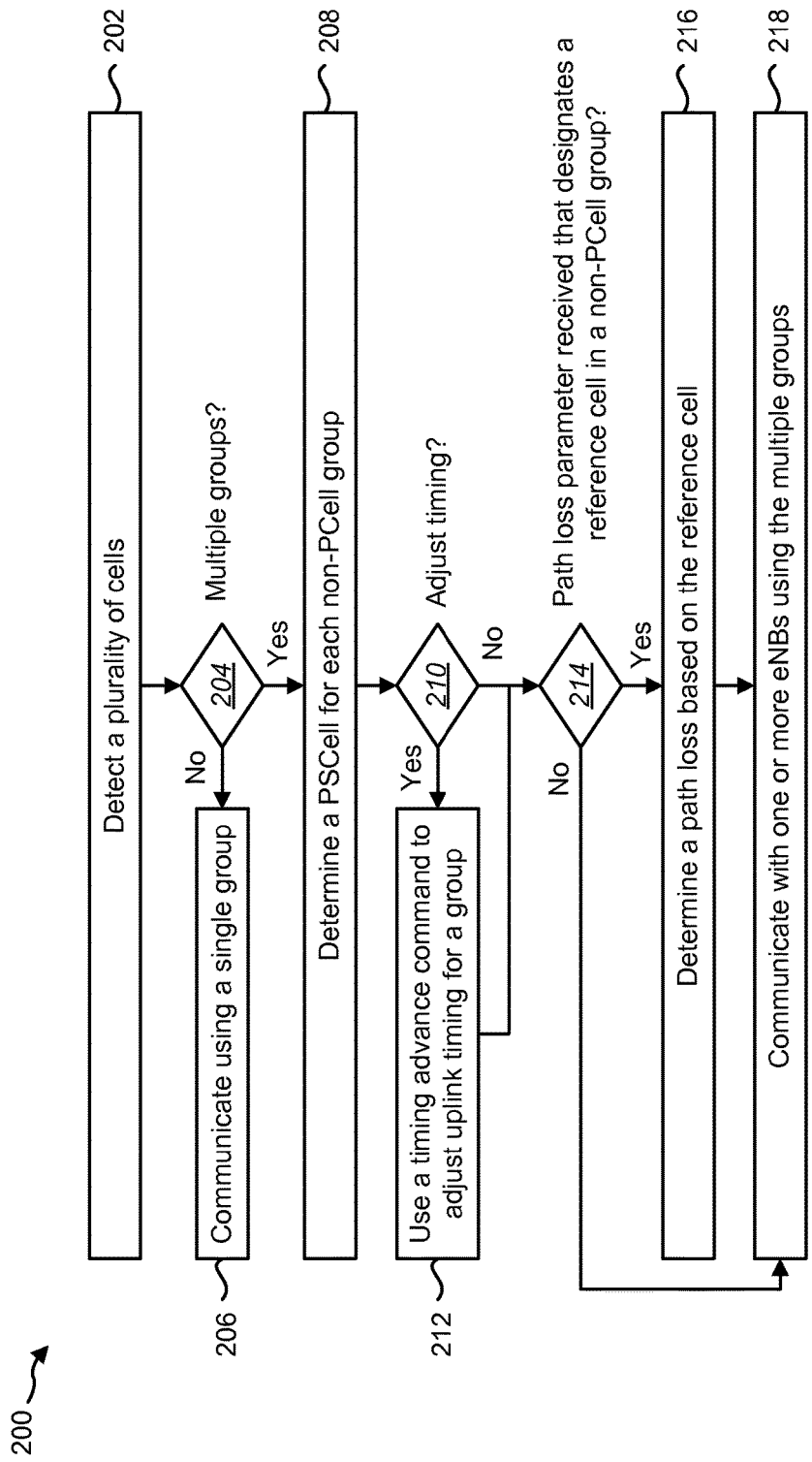
FIG. 2 is a flow diagram illustrating one configuration of a method for performing multi-group communications on a user equipment (UE)

FIG. 2 is a flow diagram illustrating one configuration of a method 200 for performing multi-group communications on a UE 102. A UE 102 may detect 202 a plurality of cells 119, 121. For example, the UE 102 may receive a synchronization signal, a beacon, a message, etc., from one or more eNBs 160 indicating that multiple groups of one or more cells 119, 121 may be used for communications. Additionally or alternatively, the UE 102 may send a signal or message (e.g., an access request, authentication information, etc.) to one or more eNBs 160 indicating that the UE 102 is seeking to communicate with the one or more eNBs 160. In this case, the one or more eNBs 160 may respond by sending a signal that allows the UE 102 to communicate with the one or more eNBs 160.

The UE 102 may determine 204 whether to use multiple groups of cells 119, 121 to communicate. If the UE 102 determines 204 not to communicate using multiple groups of cells 119, 121, the UE 102 may communicate 206 using a single group of cells 119. In some configurations, the UE 102 may determine 204 not to communicate using multiple groups of cells 119, 121, if the UE 102 is incapable of communicating using multiple groups of cells 119, 121 or for other considerations (e.g., low battery power, poor channel quality with a non-PCell group, etc.).

If the UE 102 determines 204 to communicate using multiple groups of cells 119, 121, the UE 102 may determine 208 a PSCell 121 for each non-PCell group. For example, the UE 102 may communicate with one or more eNBs 160 using one or more non-PCell group cells 121 (e.g., groups of non-PCell group cell(s) 121). The non-PCell group cell(s) 121 may include one or more SCells. In some configurations, each non-PCell group may be transmitted from a different site (e.g., eNB 160, RRH, repeater, etc.). The PSCell determination module 128 may determine a primary secondary cell (PSCell) for each non-PCell group.

For example, the UE 102 may determine 208 one or more PSCells based on UE-specific (explicit or implicit) radio resource control (RRC) signaling. In one example of implicit signaling, an SCell (in a non-PCell group) that is configured with a random access channel (RACH) may be determined 208 as the PSCell for a corresponding non-PCell group. In another example, a PSCell may be determined 208 as an SCell (in a non-PCell group) with a lowest order in a group configuration. In yet another example, an SCell configuration has a reference cell for uplink timing, which is the PSCell. For example, cells with a Cell Index #0, #1, #2, #3, #4 may be a PCell, SCell#1, SCell#2, SCell#3 and SCell#4, respectively. Continuing with the example, SCell#2 may have a Cell Index #1 as a reference cell for uplink timing which means SCell#1 is the PSCell for SCell#2. SCell#3 may have a Cell Index #0 as a reference cell for uplink timing or no reference cell parameter for uplink timing which means SCell#3 belongs to a group that includes the PCell.

Alternatively, UE 102 may determine 208 one or more PSCells based on UE-specific explicit RRC signaling. For example, the UE 102 may receive a message from one or more eNBs 160 that explicitly identifies one or more PSCells (for one or more non-PCell groups).

The UE 102 may determine 210 whether to adjust transmission timing. For example, if the UE 102 has received one or more timing advance commands from one or more eNBs 160, the UE 102 may determine 210 to adjust uplink transmission timing. However, if the UE 102 has not received any transmission advance commands, the UE 102 may determine 210 not to adjust uplink transmission timing.

If the UE 102 determines 210 to adjust uplink transmission timing, then the UE 102 may use 212 a timing advance command to adjust uplink timing for a group of cells 119, 121. For example, the UE 102 may adjust the transmission timing for one or more non-PCell groups. For instance, the UE 102 may advance or delay the timing of non-PCell group signals transmitted from the UE 102 to one or more eNBs 160 by using 212 a timing advance command that specifies the amount of time delay or advancement. The transmission timing may be different between the PCell group and one or more non-PCell groups. Additionally or alternatively, the transmission timing may be different between distinct non-PCell groups.

In one configuration, the UE 102 may adjust its uplink transmission timing for a physical uplink control channel (PUCCH), physical uplink shared channel (PUSCH) and/or sounding reference signal (SRS) of a primary cell (PCell) by using 212 a received timing advance command. The timing advance command received in a random access response may be transmitted from an eNB 160 to the UE 102 after the UE 102 has sent a random access preamble. Another received timing advance command (which refers to a timing advance command MAC element) may be transmitted from an eNB 160 to the UE 102 at any time the eNB 160 wants to change the uplink transmission timing of the UE 102.

In the case of a random access response, an 11-bit timing advance command $T_A$ may be used as described above. In other cases, a six-bit timing advance command $T_A$ may indicate adjustment of a current $N_{TA}$ value as described above.

Typically, the uplink transmission timing for a physical uplink shared channel (PUSCH) and/or sounding reference signal (SRS) of a secondary cell (SCell) may be the same as that of a primary cell (PCell). However, aggregation between cells may be introduced with different transmission and/or reception sites (e.g., different eNBs, RRHs or repeaters, etc.). In this case, the UE 102 may need to have different uplink transmission timing for each cell or groups of one or more cells. The UE 102 may control or adjust the transmission timing for one or more groups (e.g., a PCell group and/or one or more non-PCell groups).

In one configuration, the uplink transmission timing for a PUSCH and/or SRS of each SCell 119 in a PCell group may be the same as the uplink transmission timing for the corresponding PCell. In accordance with the systems and methods disclosed herein, the uplink transmission timing for a PUSCH and/or SRS of each SCell 121 in a non-PCell group may be the same as the uplink transmission timing for a corresponding PSCell.

A timing advance command in a random access response may be used 212 that is transmitted from an eNB 160 and received by the UE 102 in a PCell or in a PSCell after the UE 102 has sent a random access preamble in the PCell or the PSCell. This random access response may be scheduled by a PDCCH including a random access radio network temporary identifier (RA-RNTI), which is an identifier used for scheduling a PDSCH including a random access response.

The PCell or SCell that a received random access response is for may be distinguished by which serving cell 119, 121 the random access response is scheduled in. For example, the UE 102 may determine which cell 119, 121 (e.g., PCell, SCell, etc.) corresponds to a received random access response by determining which serving cell the random access response is scheduled in. A serving cell that the random access response is scheduled in may be determined by identifying a cell 119, 121 that has a HARQ entity, a PDCCH or a PDSCH for a random access response.

In one configuration, the UE 102 may thus determine which cell 119, 121 corresponds to a received random access response by identifying a cell 119, 121 that has a HARQ entity, a PDCCH or a PDSCH for a random access response. The random access response scheduled in a PCell downlink (DL) may be used for an uplink (UL) transmission timing adjustment for a PCell uplink. The random access response scheduled in a PSCell downlink (DL) may be used for an uplink (UL) transmission timing adjustment for a PSCell uplink. For example, the UE 102 may advance or delay the timing of transmissions for one or more non-PCell group cells 121 (in one or more non-PCell groups) based on a corresponding timing advance command. In one configuration, the transmission timing of SCells 121 in a non-PCell group may be adjusted to match the transmission timing of the PSCell in that group.

Another received timing advance command (e.g., a timing advance command MAC element) may be transmitted from an eNB 160 to the UE 102 at any time the eNB 160 wants to change the UE's 102 uplink transmission timing. Whether the received timing advance command is for the PCell or for a PSCell may be distinguished based on which serving cell 119, 121 the timing advance command is scheduled in. A serving cell 119, 121 that the timing advance command is scheduled in may be determined by identifying a cell that has a HARQ entity, a PDCCH or a PDSCH for a timing advance command. For example, the UE 102 may determine which cell 119, 121 (e.g., PCell, PSCell, etc.) a timing advance command is for by identifying a cell that has a HARQ entity, a PDCCH or a PDSCH for a timing advance command.

A timing advance command scheduled in any serving cell in a group that includes the PCell downlink (e.g., PCell group) may be used 212 for an uplink transmission timing adjustment for the PCell uplink. The transmission timing of any SCells in the PCell group may be matched to that of the PCell.

A timing advance command scheduled in any serving cell(s) in the group that includes the PSCell downlink (e.g., a non-PCell group) may be used 212 for an uplink transmission timing adjustment for the PSCell uplink. For example, the UE 102 may advance or delay the timing of transmissions for one or more non-PCell group cells 121 (in one or more non-PCell groups) based on a corresponding timing advance command. The transmission timing of any SCells 121 in a non-PCell group may be adjusted to match that of the corresponding PSCell.

In another configuration, the timing advance command MAC control element or a MAC header of the timing advance command MAC control element may indicate which group the command corresponds to. A group indication may be a cell index of a PSCell that is included in the corresponding group.

Whether or not the UE 102 determines 210 to adjust transmission timing, the UE 102 may determine 214 whether a path loss parameter is received that designates a reference cell 121 in a non-PCell group. For example, if the UE 102 receives a "pathlossReference-r11(psCell, sCell)" parameter, then the UE 102 may determine 214 that a path loss parameter is received that designates a reference cell 121 in a non-PCell group. However, if the UE 102 does not receive any path loss parameter (or receives a "pathlossReference-r10(pCell, sCell)," for example), then the UE 102 may determine 214 that no path loss parameter is received that designates a reference cell 121 in a non-PCell group.

If the UE 102 determines 214 that a path loss parameter is received that designates a reference cell 121 in a non-PCell group, then the UE 102 may determine 216 a path loss based on the reference cell 121. For example, the UE 102 may determine a received signal strength for the designated cell 121 and determine 216 the path loss based on the received signal strength. For instance, the UE 102 may subtract the received signal strength from a transmitted signal strength (as indicated by an eNB 160) to determine 216 the path loss. In some configurations, the UE 102 may generate a path loss indicator for transmission to an eNB 160 in order to indicate the path loss.

Whether or not the UE 102 determines 214 that a path loss parameter was received that designates a reference cell 121 in a non-PCell group, the UE 102 may communicate 218 with one or more eNBs 160 using the multiple groups. For example, the UE 102 may transmit information to and/or receive information from one or more eNBs 160 using one or more PCell group cells 119 and one or more non-PCell group cells 121.

Figure 3:
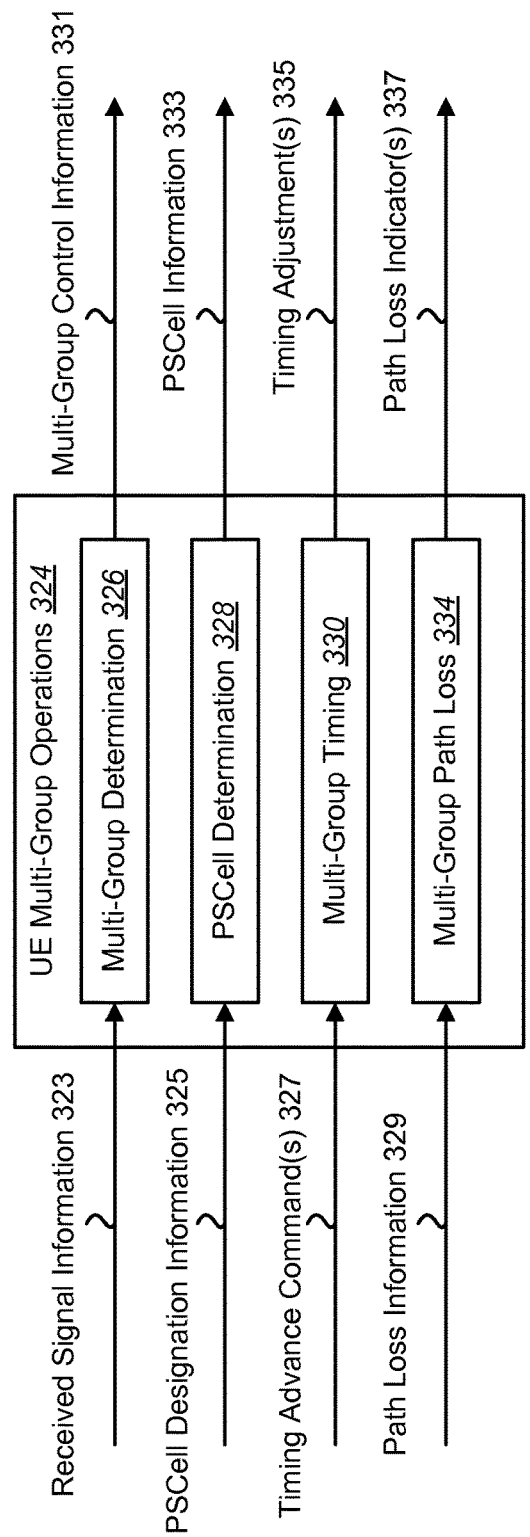
FIG. 3 is a block diagram illustrating one configuration of a user equipment (UE) multi-group operation module that may be used in accordance with the systems and methods disclosed herein.

FIG. 3 is a block diagram illustrating one configuration of a UE multi-group operation module 324 that may be used in accordance with the systems and methods disclosed herein. In general, the UE multi-group operations module 324 may enable the UE 102 to communicate with one or more eNBs 160 using multiple groups of one or more cells 119, 121. The UE multi-group operations module 324 may include one or more of a multi-group determination module 326, a PSCell determination module 328, a multi-group timing module 330 and a multi-group path loss module 334.

The multi-group determination block/module 326 may generate multi-group control information 331. Some or all of the multi-group control information 331 may be provided used by the UE 102 and/or transmitted to one or more eNBs 160 in order to allow multi-group communications.

The multi-group determination module 326 may use received signal information 323 to determine whether the UE 102 may use multiple groups of one or more cells 119, 121 to communicate with one or more eNBs 160. For example, this determination may be based on signaling received from one or more eNBs 160 that was sent unilaterally or in response to a signal sent from the UE 102.

In one configuration, the UE 102 may detect a plurality of cells 119, 121. For example, the UE 102 may monitor the received signal information 323 (e.g., one or more frequency bands) to detect whether one or more eNBs 160 may provide access to cells 119, 121. For instance, the UE 102 may receive a broadcast, timing or beacon signal (e.g., received signal information 323) from one or more eNBs 160 indicating that the one or more eNBs 160 may provide cell(s) 119, 121 for communication. In another example, the UE 102 may transmit a signal or message (e.g., a search signal or message) to one or more eNBs 160. The one or more eNBs 160 may then send a signal in response to the UE 102 indicating that one or more cells 119, 121 may be used for communication.

The multi-group determination module 326 may use additional or alternative information to determine whether to use multiple groups of one or more cells 119, 121. For example, the UE 102 may determine whether to use multiple groups of cell(s) 119, 121 based on channel or cell 119, 121 quality, UE 102 capacity, battery life, type of use (e.g., streaming media, voice call, emergency, etc.) and/or other factors. The multi-group control information 331 may indicate whether multi-group communications are to be used. This indication may be provided to the UE 102 to enable the UE 102 to use multiple groups of cells 119, 121.

The multi-group determination module 326 may also notify one or more eNBs 160 of the UE's 102 multi-group communications capability. For example, A UE 102 may need to have more than one transmitter 158 in order to perform multiple uplink timing adjustments. The multi-group control information 331 may be transmitted to inform an eNB 160 of the UE's 102 capability to support multiple uplink timing adjustments in a certain band combination and/or may inform an eNB 160 of the maximum supportable number of uplink timing adjustments groups.

The primary secondary cell (PSCell) determination module 328 may determine a PSCell for one or more groups of non-PCell group cell(s) 121. In one configuration, the PSCell determination block/module 328 may use PSCell designation information 325 to produce PSCell information 333. The PSCell information 333 may indicate a primary secondary cell (PSCell) for each non-PCell group.

For example, the PSCell determination module 328 may produce PSCell information 333 based on the PSCell designation information 325. In one configuration, the PSCell designation information 325 may be UE-specific (explicit or implicit) radio resource control (RRC) signaling. In one example of implicit signaling, an SCell (in a non-PCell group) that is configured with a random access channel (RACH) may be determined as the PSCell for a corresponding non-PCell group. In another example, a PSCell may be determined as an SCell (in a non-PCell group) with a lowest order in a group configuration. In yet another example, an SCell configuration has a reference cell for uplink timing, which is the PSCell. For example, cells with a Cell Index #0, #1, #2, #3, #4 may be a PCell, SCell#1, SCell#2, SCell#3 and SCell#4, respectively. Continuing with the example, SCell#2 may have a Cell Index #1 as a reference cell for uplink timing which means SCell#1 is the PSCell for SCell#2. SCell#3 may have a Cell Index #0 as a reference cell for uplink timing or no reference cell parameter for uplink timing which means SCell#3 belongs to a group that includes the PCell.

Alternatively, the PSCell determination module 328 may determine one or more PSCells based on explicit PSCell designation information 325 (e.g., UE-specific explicit RRC signaling). For example, one or more eNBs 160 may send a message to the UE 102 that explicitly identifies one or more PSCells (for one or more non-PCell groups). In this case, the PSCell determination module 328 may indicate the one or more designated PSCells in the PSCell information 333.

The multi-group timing module 330 may control (e.g., adjust) the transmission timing for one or more groups based on one or more timing advance commands 327. The multi-group timing module 330 may produce one or more timing adjustments 335. For example, the timing adjustment(s) 335 may adjust the transmission timing for one or more non-PCell groups. For instance, a timing adjustment 335 may use the timing advance command(s) 327 to advance or delay the timing of non-PCell group signals transmitted from the UE 102 to one or more eNBs 160.

The multi-group timing module 330 may adjust timing as described in connection with the multi-group timing module 130 in FIG. 1. For example, a timing advance command 327 may be included in a random access response or may be a MAC element. The multi-group timing module 330 may determine which cell(s) 119, 121 a timing advance command 327 corresponds to as described above.

The multi-group timing module 330 may then generate one or more timing adjustment(s) 335 to advance or delay the transmission timing of one or more cells 119, 121 by an amount indicated by the timing advance command(s) 327. For example, the timing adjustment(s) 335 may indicate that a PCell uplink radio frame (and any uplink radio frames corresponding to any SCells 119 in the PCell group) should be adjusted to precede a PCell downlink radio frame by a certain amount of time. Additionally or alternatively, the timing adjustment(s) 335 may indicate that a PSCell uplink radio frame (and any uplink radio frames corresponding to any SCells 121 in a corresponding PSCell group) should be adjusted to precede a PSCell downlink radio frame by a certain amount of time.

The multi-group path loss module 334 may be used to produce one or more path loss indicators 337 based on path loss information 329 for one or more non-PCell groups. In one configuration, the multi-group path loss module 334 may additionally be used to produce a path loss indicator 337 based on path loss information 329 for a PCell group. For example, in the case that an SCell 121 belongs to a non-PCell group, the multi-group path loss module 334 may produce a path loss indicator 337 corresponding to a designated cell 121. A cell 121 used to measure the path loss may be designated by path loss information 329 (e.g., a "pathlossReference-r11(psCell, sCell)" parameter instead of a typical path loss parameter "pathlossReference-r10(pCell, sCell)").

If the UE 102 is configured with multiple uplink time alignments, a "pathlossReference-r11" parameter may be included in path loss information 329 that indicates which PSCell 121 or SCell 121 is used as a reference for the path loss measurement for an SCell 121 in each SCell configuration. Therefore, the typical parameter "pathlossReference-r10(pCell, sCell)" may be replaced by a "pathlossReference-r11(psCell, sCell)" parameter in the case that an SCell 121 belongs to a non-PCell group. In another configuration, a selection among a PCell, a PSCell and an SCell may be used (as indicated by path loss information 329, for example). More specifically, a selection among a PCell, a PSCell and an SCell may be used (e.g., a "pathlossReference-r11(pCell, psCell, sCell)" parameter may be used). The pathlossReference-r11 parameter may be sent from an eNB to the UE.

Figure 4:
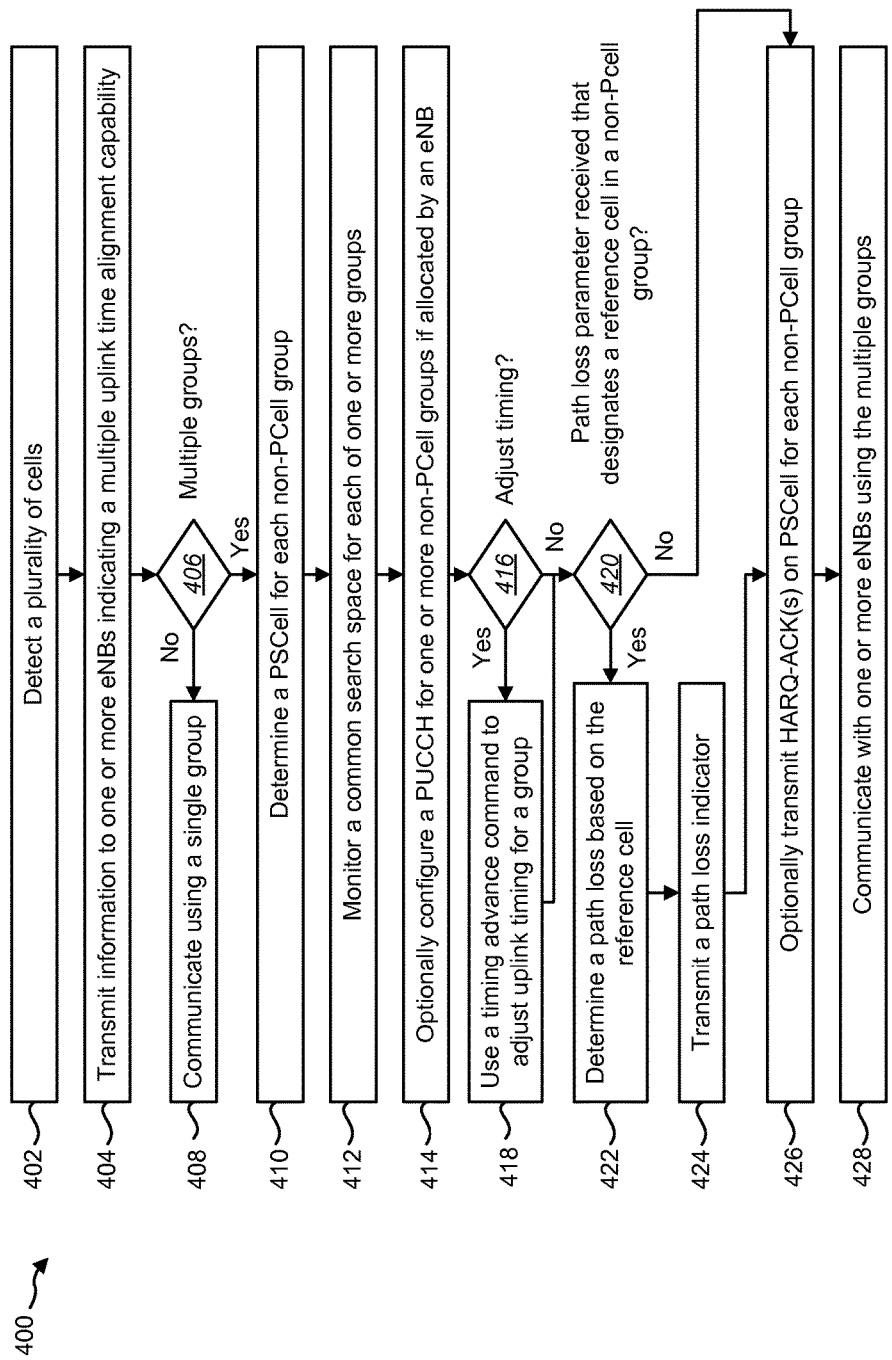
FIG. 4 is a flow diagram illustrating a more specific configuration of a method for performing multi-group communications on a user equipment (UE)

FIG. 4 is a flow diagram illustrating a more specific configuration of a method 400 for performing multi-group communications on a UE 102. A UE 102 may detect 402 a plurality of cells 119, 121. For example, the UE 102 may detect 402 a plurality of cells 119, 121 as described in connection with step 202 of FIG. 2 above.

The UE 102 may transmit 404 information to one or more eNBs 160 indicating a multiple uplink time alignment capability. For example, the UE 102 may transmit 404 a message or signal to the one or more eNBs 160 indicating that the UE 102 is capable of using multiple time alignments. For instance, this may indicate that the UE 102 has multiple transmitters 158.

The UE 102 may determine 406 whether to use multiple groups of cells 119, 121 to communicate. For example, this may done as described in connection with step 204 of FIG. 2 above. If the UE 102 determines 406 not to communicate using multiple groups of cells 119, 121, the UE 102 may communicate 408 using a single group of cells 119.

If the UE 102 determines 406 to communicate using multiple groups of cells 119, 121, the UE 102 may determine 410 a PSCell 121 for each non-PCell group. This may be done as described in connection with step 208 of FIG. 2 above.

The UE 102 may monitor 412 a common search space for each of one or more groups. Typically, there is only one common search space in a PCell and there is no common search space in an SCell. However, in accordance with the systems and methods disclosed herein, one or more additional common search spaces may be used in one or more corresponding PSCell(s). The UE 102 may monitor 412 a set of PDCCH candidates for control information on one or more activated serving cells 119, 121 as configured by higher layer signaling. More than one serving cell 119, 121 may be configured by RRC signaling and a serving cell may be activated or deactivated by MAC signaling.

The set of PDCCH candidates to monitor 412 may be defined in terms of search spaces. Typically, there is a common search space on the primary cell (PCell) 119 and a UE-specific search space on the PCell 119 and/or one or more SCells. In this case, the common search space may be cell-specific and only on the PCell 119. The UE-specific search space may be defined by a cell radio network temporary identifier or C-RNTI (e.g., user equipment identifier (UEID)) and may be prepared for each serving cell 119, 121.

Typically, different kinds of information or data may be transmitted in a common search space. For example, a PDCCH to schedule system information or paging information, random access related information or normal UE 102 transmission data 146 may be transmitted in the common search space. The physical layer of a UE 102 may be configured by higher layers with a RNTI. The UE 102 may decode the PDCCH with a cyclic redundancy check (CRC) scrambled by the RNTI. Downlink control information that is conveyed by PDCCH may have attached CRC. The CRC may be scrambled by the RNTI. For example, the CRC may be XORed with the RNTI. In some cases, the UE 102 may monitor 412 the RNTI (if it is configured to be monitored, for example). The RA-RNTI and the temporary C-RNTI may be used for PDCCH random access-related scheduling information.

However, in accordance with the systems and methods disclosed herein and in order to have multiple time alignments, the UE 102 may need to perform a random access procedure in a PSCell 121. Thus, a UE 102 configured with an SCell with a random access channel (RACH) may be required to monitor 412 a PDCCH in the common search space in the PSCell 121 in addition to the common search space in the PCell 119. There may be no need to monitor a SI-RNTI, a P-RNTI and an SPS C-RNTI in the PSCell 121, since it may be sufficient to monitor 412 them in the common search space in the PCell 119. Therefore, the C-RNTI, RA-RNTI, temporary C-RNTI, TPC-PUCCH-RNTI and TPC-PUSCH-RNTI may be monitored 412 by the multi-group monitoring module 132 in the common search space in a PSCell 121.

The UE 102 may optionally configure 414 a PUCCH for one or more non-PCell groups if allocated by an eNB 160. For example, a PSCell 121 may have a PUCCH in addition to a PUCCH corresponding to the PCell 119. Typically, a PUCCH may be allowed to be assigned only to a PCell 119 because of uplink transmission power mitigation. However, if the UE 102 is configured with multiple uplink time alignments, an eNB 160 may allocate the PUCCH in a PSCell 121. For example, the UE 102 may receive a message or command from one or more eNBs 160 allocating a PUCCH for one or more non-PCell groups. The UE 102 may accordingly configure 414 (e.g., establish, send control information on, etc.) a PUCCH for one or more non-PCell groups as indicated by the one or more eNBs 160. It should be noted that a periodic channel quality indicator, precoding matrix indicator and/or rank indicator (CQI/PMI/RI) report on a PUCCH may be modified to be mapped to a PUCCH in a PSCell 121 since their resources may be semi-statically assigned using an RRC message.

The UE 102 may determine 416 whether to adjust transmission timing. For example, if the UE 102 has received one or more timing advance commands from one or more eNBs 160, the UE 102 may determine 416 to adjust transmission timing. However, if the UE 102 has not received any transmission timing commands, the UE 102 may determine 416 not to adjust transmission timing.

If the UE 102 determines 416 to adjust transmission timing, then the UE 102 may use 418 a timing advance command to adjust uplink timing for a group of cells 119, 121. For example, this may be done as described in connection with step 212 of FIG. 2 above.

Whether or not the UE 102 determines 416 to adjust transmission timing, the UE 102 may determine 420 whether a path loss parameter is received that designates a reference cell 121 in a non-PCell group. For example, this may be done as described in connection with step 214 of FIG. 2 above.

If the UE 102 determines 420 that a path loss parameter is received that designates a reference cell 121 in a non-PCell group, then the UE 102 may determine 422 a path loss based on the reference cell 121. For example, this may be done as described in connection with step 216 of FIG. 2 above. The UE 102 may transmit 424 a path loss indicator. For example, the UE 102 may generate a path loss indicator based on the path loss determined 422. The path loss indicator may specify the path loss as measured by the UE 102 for the reference cell. The UE 102 may transmit 424 this path loss indicator to an eNB 160.

Whether or not the UE 102 determines 420 that a path loss parameter was received that designates a reference cell 121 in a non-PCell group, the UE 102 may optionally transmit 426 one or more HARQ-ACK(s) (e.g., ACK/NACKs) on a PSCell for each non-PCell group. For example, a HARQ-ACK message (e.g., one or more ACK/NACKs) may be generated based on each group of one or more serving cells 121. For instance, when a specified amount of data (e.g., packet) is incorrectly received (and is unrecoverable, for example), the UE 102 may generate and transmit 426 a negative acknowledgement (NACK). Additionally or alternatively, the UE 102 may generate and transmit 426 an acknowledgement (ACK) for a specified amount of data (e.g., packet) that was correctly received. In some configurations, HARQ-ACK(s) corresponding to cells 121 in a group may be transmitted 426 on a PSCell 121 in the group. Optionally, HARQ-ACK(s) corresponding to cells 119 in a PCell group may be transmitted on the PCell 119. In the case that a PUCCH is configured 414 for at least one non-PCell groups, a HARQ-ACK message (e.g., one or more ACK/NACKs) may optionally be mapped to a PUCCH in a PSCell 121.

The UE 102 may communicate 428 with one or more eNBs 160 using the multiple groups. For example, the UE 102 may transmit information to and/or receive information from one or more eNBs 160 using one or more PCell group cells 119 and one or more non-PCell group cells 121.

Figure 5:
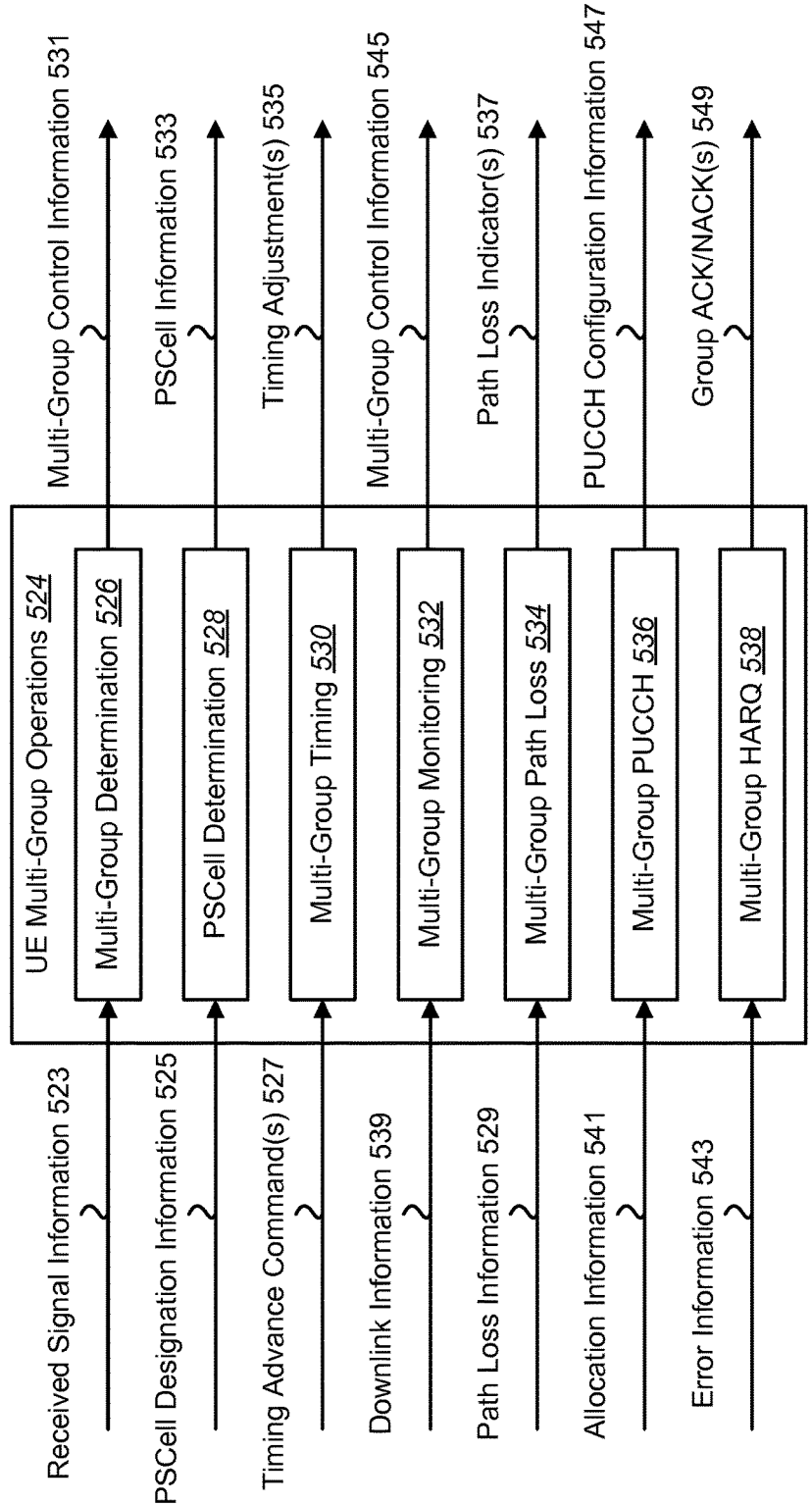
FIG. 5 is a block diagram illustrating another configuration of a user equipment (UE) multi-group operation module that may be used in accordance with the systems and methods disclosed herein.

FIG. 5 is a block diagram illustrating another configuration of a UE multi-group operation module 524 that may be used in accordance with the systems and methods disclosed herein. In general, the UE multi-group operations module 524 may enable the UE 102 to communicate with one or more eNBs 160 using multiple groups of one or more cells 119, 121. The UE multi-group operations module 524 may include one or more of a multi-group determination module 526, a PSCell determination module 528, a multi-group timing module 530, a multi-group monitoring module 532, a multi-group path loss module 534, a multi-group PUCCH module 536 and a multi-group HARQ module 538.

The multi-group determination block/module 526 may generate multi-group control information 531. Some or all of the multi-group control information 531 may be used by the UE 102 and/or transmitted to one or more eNBs 160 in order to allow multi-group communications. The multi-group determination module 526 may also use received signal information 523. For example, the multi-group determination module 526 may operate similar to the multi-group determination module 326 described in connection with FIG. 3 above.

The primary secondary cell (PSCell) determination module 528 may determine a PSCell for one or more groups of non-PCell group cell(s) 121. In one configuration, the PSCell determination block/module 528 may use PSCell designation information 525 to produce PSCell information 533. The PSCell information 533 may indicate a primary secondary cell (PSCell) for each non-PCell group. For example, the PSCell determination module 528 may operate similar to the PSCell determination module 328 described in connection with FIG. 3 above.

The multi-group timing module 530 may control (e.g., adjust) the uplink transmission timing for one or more groups based on one or more timing advance commands 527. The multi-group timing module 530 may produce one or more timing adjustments 535. For example, the timing adjustment(s) 535 may adjust the transmission timing for one or more non-PCell groups. For instance, a timing adjustment 535 may use the timing advance command(s) 527 to advance or delay the timing of non-PCell group signals transmitted from the UE 102 to one or more eNBs 160. The multi-group timing module 530 may adjust timing similar to the multi-group timing module 330 described in connection with FIG. 3 above.

The multi-group monitoring module 532 may be used to monitor common search spaces for multiple groups. For example, the multi-group monitoring module 532 may use downlink information 539 (e.g., one or more PDCCH candidates) to produce multi-group control information 545. In accordance with the systems and methods disclosed herein, one or more additional common search spaces may be used in one or more corresponding PSCell(s). The UE 102 may monitor a set of PDCCH candidates for control information on one or more activated serving cells 119, 121 as configured by higher layer signaling. More than one serving cell 119, 121 may be configured by RRC signaling and a serving cell may be activated or deactivated by MAC signaling.

The set of PDCCH candidates (e.g., the downlink information 539) to monitor may be defined in terms of search spaces. Typically, there is a common search space on the primary cell (PCell) 119 and a UE-specific search space on the PCell 119 and/or one or more SCells. In this case, the common search space may be cell-specific and only on the PCell 119. The UE-specific search space may be defined by a cell radio network temporary identifier or C-RNTI (e.g., user equipment identifier (UEID)) and may be prepared for each serving cell 119, 121.

Different kinds of information or data may be transmitted in a common search space. For example, a PDCCH to schedule system information or paging information, random access related information or normal UE 102 transmission data 146 may be transmitted in the common search space. The multi-group control information 545 generated by the multi-group monitoring module 532 may identify or include such information (e.g., system information or paging information scheduling, random access related information, etc.). This multi-group control information 545 may be used to control communications for one or more groups (e.g., non-PCell groups).

The physical layer of a UE 102 may be configured by higher layers with a RNTI. The UE 102 may decode the PDCCH with a cyclic redundancy check (CRC) scrambled by the RNTI. Downlink (control) information 539 that is conveyed by a PDCCH may have attached CRC. The CRC may be scrambled by the RNTI (and may be unscrambled by the UE 102). For example, the CRC may be XORed with the RNTI. In some cases, the UE 102 may monitor the RNTI (if it is configured to be monitored, for example). The RA-RNTI and the temporary C-RNTI may be used for PDCCH random access-related scheduling information.

In accordance with the systems and methods disclosed herein and in order to have multiple time alignments, the UE 102 may need to perform a random access procedure in a PSCell 121. Thus, a UE 102 configured with an SCell with a random access channel (RACH) may be required to monitor a PDCCH in the common search space in the PSCell 121 in addition to the common search space in the PCell 119. There may be no need to monitor a SI-RNTI, a P-RNTI and an SPS C-RNTI in the PSCell 121, since it may be sufficient to monitor them in the common search space in the PCell 119. Therefore, the C-RNTI, RA-RNTI, temporary C-RNTI, TPC-PUCCH-RNTI and TPC-PUSCH-RNTI (which may occur in the downlink information 539) may be monitored by the multi-group monitoring module 532 in the common search space in a PSCell 121.

The multi-group path loss module 534 may be used to produce one or more path loss indicators 537 based on path loss information 529 for one or more non-PCell groups. In one configuration, the multi-group path loss module 534 may additionally be used to produce a path loss indicator 537 based on path loss information 529 for a PCell group. For example, the multi-group path loss module 534 may operate similar to the multi-group path loss module 334 described in connection with FIG. 3 above.

The multi-group PUCCH module 536 may configure one or more PUCCHs corresponding to one or more non-PCell groups. For example, the multi-group PUCCH module 536 may generate PUCCH configuration information 547 based on allocation information 541. For instance, a PSCell 121 may have a PUCCH in addition to a PUCCH corresponding to the PCell 119. Typically, a PUCCH may be allowed to be assigned only to a PCell 119 because of uplink transmission power mitigation. However, if the UE 102 is configured with multiple uplink time alignments, an eNB 160 may allocate the PUCCH in a PSCell 121. More specifically, the UE 102 may receive allocation information 541 from one or more eNBs 160 indicating a command or request to establish one or more PUCCHs. Based on the allocation information 541, the multi-group PUCCH module 536 may provide PUCCH configuration information 547 (e.g., channel information, timing information, etc.) that allows the UE 102 to establish one or more PUCCHs with one or more eNBs 160. A periodic channel quality indicator, precoding matrix indicator and/or rank indicator (CQI/PMI/RI) report on a PUCCH may be modified to be mapped to a PUCCH in a PSCell 121 since their resources may be semi-statically assigned using an RRC message.

The multi-group HARQ module 538 may generate one or more group ACK/NACKs 549 for one or more non-PCell groups based on error information 543. The error information 543 may specify information that was not correctly received from one or more eNBs 160 and/or that could not be recovered. The multi-group HARQ module 538 may generate one or more group ACK/NACKs 549 corresponding to the incorrectly received or unrecoverable information. The group ACK/NACKs 549 may correspond to (e.g., be mapped to) one or more particular cells. For example, a hybrid automatic repeat request acknowledgement (HARQ-ACK) corresponding to non-PCell group cells 121 in a group may be transmitted on the PSCell 121 in the group.

A hybrid automatic repeat request acknowledgement (HARQ-ACK) may optionally be mapped to a PUCCH in a PSCell 121. The HARQ-ACK may be generated based on each group of one or more serving cells 121. In some configurations, HARQ-ACK(s) (e.g., ACK/NACKs) corresponding to cells 119, 121 in a group may be transmitted on a PCell 119 or a PSCell 121 in the group.

Figure 6:
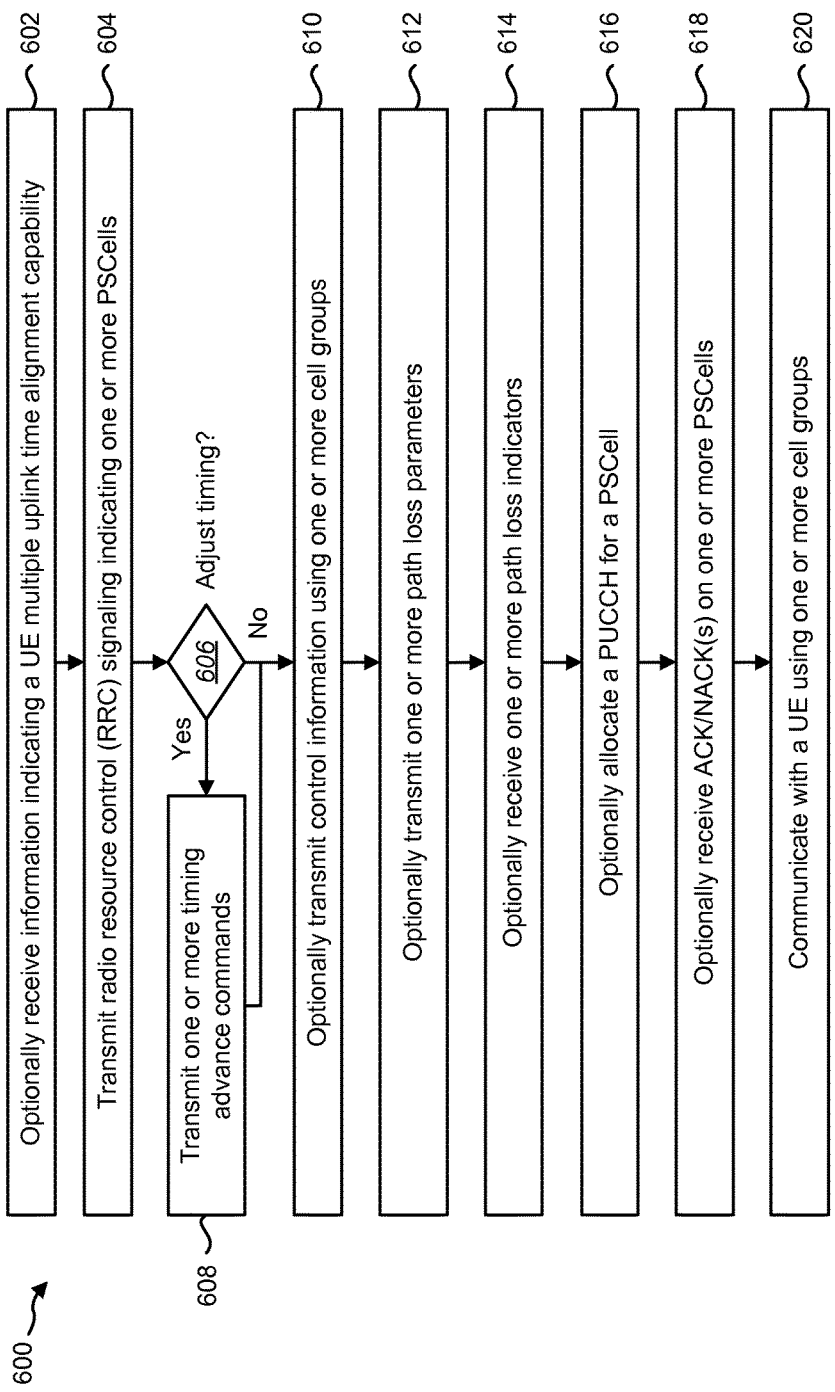
FIG. 6 is a flow diagram illustrating one configuration of a method for performing multi-group communications on an evolved Node B (eNB)

FIG. 6 is a flow diagram illustrating one configuration of a method 600 for performing multi-group communications on an eNB 160. An eNB 160 may optionally receive 602 information indicating a UE 102 multiple uplink time alignment capability. For example, the eNB 160 may receive information or a message from a UE 102 indicating that the UE 102 is capable of using multiple uplink transmission timing alignments. More specifically, this information or message may inform the eNB 160 of the UE's 102 capability to support multiple uplink timing adjustments in a certain band combination and/or may inform an eNB 160 of the maximum supportable number of uplink timing adjustments groups. In some configurations, the eNB 160 may initially query a UE 102 (e.g., send a message to the UE 102) whether the UE 102 is capable of supporting multiple uplink timing adjustments.

The eNB 160 may transmit 604 radio resource control (RRC) signaling indicating one or more PSCells. For example, the eNB 160 may designate one or more PSCells by sending UE-specific (explicit or implicit) radio resource control (RRC) signaling. In one example of implicit signaling, an SCell (in a non-PCell group) that is configured with a random access channel (RACH) may be the PSCell for a corresponding non-PCell group. In this example, signaling that indicates or designates a RACH may indicate a PSCell designation to the UE 102. In another example, a PSCell may be an SCell (in a non-PCell group) with a lowest order in a group configuration. Thus, signaling from the eNB 160 that may be used to establish an SCell order may indicate the PSCell, for instance. In yet another example, an SCell configuration has a reference cell for uplink timing, which is the PSCell. For example, cells with a Cell Index #0, #1, #2, #3, #4 may be a PCell, SCell#1, SCell#2, SCell#3 and SCell#4, respectively. Continuing with the example, SCell#2 may have a Cell Index #1 as a reference cell for uplink timing which means SCell#1 is the PSCell for SCell#2. SCell#3 may have a Cell Index #0 as a reference cell for uplink timing or no reference cell parameter for uplink timing which means SCell#3 belongs to a group that includes the PCell.

Alternatively, the eNB 160 may designate one or more PSCells using UE-specific explicit RRC signaling. For example, the eNB 160 may send a message to the UE 102 that explicitly identifies one or more PSCells (for one or more non-PCell groups).

The eNB 160 may determine 606 whether to adjust timing. In one configuration, the eNB 160 may use a signal or message sent from the UE 102 (e.g., random access request, etc.) to determine whether to adjust uplink timing. For example, the eNB 160 may determine whether one or more uplink transmissions from the UE 102 arrive within a certain time frame or schedule. If an uplink transmission from the UE 102 is not aligned or synchronized to be within a certain time frame, the eNB 160 may determine 606 to adjust timing. However, if an uplink transmission from the UE 102 is within the time frame, the eNB 160 may determine 606 not to adjust timing. In some configurations, the time frame may be defined in terms of a cyclic prefix in an orthogonal frequency division multiplexing (OFDM) symbol. Additionally or alternatively, the time frame may be specified in terms of a difference in time between a downlink radio frame and an uplink radio frame. It should be noted that the term "synchronize" and variations thereof may or may not denote an exact alignment in time, but may denote an overlapping of events or events occurring within a range of time from each other.

If the eNB 160 determines 606 to adjust timing, the eNB 160 may transmit 608 one or more timing advance commands. For example, the eNB 160 may send a timing advance command to the UE 102 to adjust the transmission timing for one or more non-PCell groups. This may cause the UE 102 to advance or delay the timing of non-PCell group signals transmitted from the UE 102 corresponding to an eNB 160 based on one or more timing advance commands sent from the eNB 160.

A timing advance command in a random access response may be transmitted 608 from an eNB 160 to the UE 102 after the UE 102 has sent a random access preamble (to the eNB 160). Another timing advance command (which refers to a timing advance command MAC element) may be transmitted 608 from an eNB 160 to the UE 102 at any time the eNB 160 wants to change the uplink transmission timing of the UE 102. The uplink transmission timing may be adjusted from time to time to account for changes in the RF delay as the relative position of the UE 102 changes in respect to a corresponding eNB 160. In this manner, the eNB 160 may provide that all signals from UEs to the eNB 160 reach the eNB 160 at approximately the same time or within a cyclic prefix in an orthogonal frequency division multiplexing (OFDM) symbol. One configuration of timing advance commands is given as follows.

In the case of a random access response, an 11-bit timing advance command $T_A$ may indicate $N_{TA}$ values by index values of $T_A=0, 1, 2, \ldots, 1282$, where an amount of the time alignment is given by $N_{TA}=T_A \times 16$.

In other cases, a six-bit timing advance command $T_A$ may indicate adjustment of a current $N_{TA}$ value (denoted $N_{TA,old}$) to a new $N_{TA}$ value (denoted $N_{TA,new}$) by index values of $T_A=0, 1, 2, \ldots, 63$, where $N_{TA,new}=N_{TA,old}+(T_A-31) \times 16$. In this case, adjustment of an $N_{TA}$ value by a positive or a negative amount indicates advancing or delaying the uplink transmission timing by a given amount, respectively.

Whether or not the eNB 160 determines 606 to adjust timing, the eNB 160 may optionally transmit 610 control information using one or more cell groups. For example, the eNB 160 may schedule communications for one or more groups of cells 119, 121. For instance, the eNB 160 may allocate communication resources to the UE 102 by sending a random access response to the UE 102. In some instances, scheduling information may be sent to the UE 102 using a PDCCH.

For example, a PDCCH to schedule system information or paging information may be transmitted by an eNB 160. The physical layer of a UE 102 may be configured by higher layers with a RNTI. Downlink control information that is conveyed by PDCCH may have attached CRC. The eNB 160 may scramble the CRC using the RNTI. For example, the CRC may be XORed with the RNTI. The RA-RNTI and the temporary C-RNTI may be used for PDCCH random access-related scheduling information.

In one configuration, a PSCell may not be cross-carrier scheduled. This means that other cells may not schedule a PSCell. On the other hand, a PSCell may schedule other cells. Thus, for example, the eNB 160 may schedule one or more SCells and/or a PSCell using the PSCell. However, the eNB 160 may not schedule a PSCell using a separate SCell.

The eNB 160 may optionally transmit 612 one or more path loss parameters. This may be done for one or more non-PCell groups, for example. In one configuration, the eNB 160 may manage one or more path loss parameters for one or more non-PCell groups. For example, in the case that an SCell 121 belongs to a non-PCell group, the eNB 160 may generate a path loss parameter (e.g., pathlossReference-r11(psCell, sCell)) in order to designate a non-PCell group cell 121 as a path loss reference instead of a typical path loss parameter (e.g., pathlossReference-r10(pCell, sCell)). The eNB 160 may transmit 612 this path loss parameter to the UE 102. The path loss parameter may designate a cell used by a UE 102 to measure a path loss.

The eNB 160 may optionally receive 614 one or more path loss indicators. For example, the eNB 160 may receive a path loss indicator (from the UE 102) that indicates a path loss as measured by the UE 102 corresponding to the reference cell designated by a transmitted 612 path loss parameter. The eNB 160 may use the path loss indicator to adjust transmissions (e.g., increase or decrease the amplification for a signal) to the UE 102.

The eNB 160 may optionally allocate 616 a PUCCH for a PSCell. For example, the eNB 160 may allocate 616 one or more PUCCHs corresponding to one or more non-PCell groups. For example, a PSCell 121 may have a PUCCH in addition to a PUCCH corresponding to the PCell 119. For instance, if the UE 102 is configured with multiple uplink time alignments, an eNB 160 may allocate the PUCCH in a PSCell 121. In one configuration, the eNB 160 sends a configuration message or request to the UE 102 commanding or requesting the UE 102 to establish a PUCCH (in a PSCell 121).

The eNB 160 may optionally receive 618 one or more ACK/NACKs on one or more PSCells (e.g., for one or more non-PCell groups). ACK/NACKs corresponding to non-PCell group cells 121 in a group may be received 618 by the eNB 160 on the PSCell 121 in the group. ACK/NACK(s) may optionally be mapped to a PUCCH in a PSCell 121. In some configurations, HARQ-ACK(s) corresponding to cells 119, 121 in a group may be received on a PCell 119 or a PSCell 121 in the group. An eNB 160 may use the one or more ACK/NACKs to retransmit information that was not correctly received by the UE 102.

The eNB 160 may communicate 620 with a UE 102 using one or more cell groups. For example, the eNB 160 may send information to and/or receive information from the UE 102 using one or more PCell group cells 119 and one or more non-PCell group cells 121.

Figure 7:
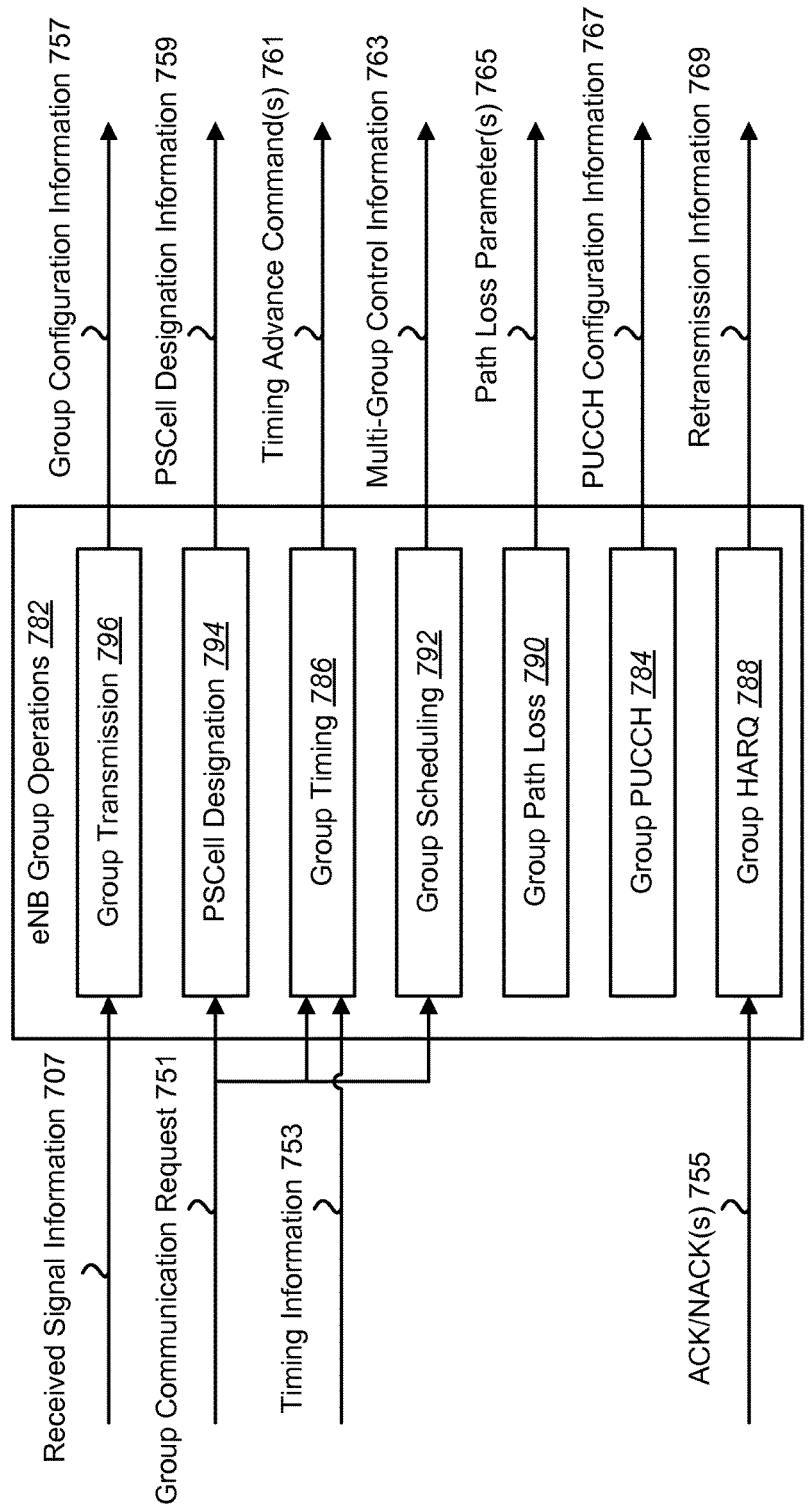
FIG. 7 is a block diagram illustrating one configuration of an evolved Node B (eNB) group operations module that may be used to enable multi-group communications on an eNB.

FIG. 7 is a block diagram illustrating one configuration of an eNB group operations module 782 that may be used to enable multi-group communications on an eNB 160. In general, the eNB group operations module 782 may enable an eNB 160 to communicate with a UE 102 that is using multiple groups of one or more cells 119, 121. The eNB group operations module 782 may include one or more of a group transmission module 796, a PSCell designation module 794, a group timing module 786, a group scheduling module 792, a group path loss module 790, a group PUCCH module 784 and a group hybrid automatic repeat request (HARQ) module 788.

The group transmission module 796 may determine a group transmission capability of the UE 102. For example, the group transmission module 796 may use received signal information 707 to determine whether the UE 102 may use multiple groups of one or more cells 119, 121 to communicate with one or more eNBs 160. As described above, the UE 102 may need to have multiple transmitters to use multiple transmission timing alignments. The received signal information 707 may indicate whether the UE 102 is capable of multiple timing adjustments (in a certain band combination) and/or may indicate a maximum supportable number of uplink timing adjustments groups, for instance. This determination may be based on signaling received from the UE 102 that was sent unilaterally or in response to a signal sent from the eNB 160.

The group transmission module 796 may generate group configuration information 757 based on its determination of whether the UE 102 is capable of supporting multi-group communications. The group configuration information 757 may be used to configure communications with the UE 102. For instance, the group configuration information 757 may be used to determine whether to establish additionally communication channel(s) (e.g., cells 121) with the UE 102, whether to send PSCell designation information, etc.

The primary secondary cell (PSCell) designation module 794 may designate a PSCell for one or more groups of non-PCell group cell(s) 121. For example, the eNB 160 may generate PSCell designation information 759 that designates a particular SCell as a PSCell. In some cases and/or configurations, the PSCell designation information 759 may be generated based on a group communication request 751 received from the UE 102. For example, the PSCell designation information 759 may be sent to a UE 102 in response to a random access request. Alternatively, the eNB 160 may unilaterally generate and send the PSCell designation information 759 to the UE 102.

For example, the PSCell designation module 794 may designate one or more PSCells using UE-specific (explicit or implicit) radio resource control (RRC) signaling. In one example of implicit signaling, an SCell (in a non-PCell group) that is configured with a random access channel (RACH) may be implicitly designated as the PSCell for a corresponding non-PCell group. In another example, a PSCell may be designated as an SCell (in a non-PCell group) with a lowest order in a group configuration. In yet another example, an SCell configuration has a reference cell for uplink timing, which is the PSCell. For example, cells with a Cell Index #0, #1, #2, #3, #4 may be a PCell, SCell#1, SCell#2, SCell#3 and SCell#4, respectively. Continuing with the example, SCell#2 may have a Cell Index #1 as a reference cell for uplink timing which means SCell#1 is the PSCell for SCell#2. SCell#3 may have a Cell Index #0 as a reference cell for uplink timing or no reference cell parameter for uplink timing which means SCell#3 belongs to a group that includes the PCell.

Alternatively, the PSCell designation module 794 may designate one or more PSCells using UE-specific explicit RRC signaling. For example, the eNB 160 may send PSCell designation information 759 to the UE 102 that explicitly identifies one or more PSCells (for one or more non-PCell groups).

The group timing module 786 may manage the transmission timing for one or more groups. For example, the group timing module 786 may send a timing advance command 761 to the UE 102 to adjust the transmission timing for one or more non-PCell groups. For instance, the eNB 102 may obtain timing information 753 that indicates a difference in time between a given time and a received uplink radio frame from the UE 102. Based on this difference, the eNB 102 may generate one or more timing advance commands 761. The eNB 160 may transmit the one or more timing advance commands 761. For example, the group timing module 786 may send a timing advance command 761 to the UE 102 to adjust the transmission timing for one or more non-PCell groups. This may cause the UE 102 to advance or delay the timing of non-PCell group signals transmitted from the UE 102 corresponding to an eNB 160 based on one or more timing advance commands 761 sent from the eNB 160.

A timing advance command 761 in a random access response may be transmitted from an eNB 160 to the UE 102 after the UE 102 has sent a random access preamble (e.g., group communication request 751) to the eNB 160. Another timing advance command 761 (which refers to a timing advance command MAC element) may be transmitted from an eNB 160 to the UE 102 at any time the eNB 160 wants to change the uplink transmission timing of the UE 102. The uplink transmission timing may be adjusted from time to time to account for changes in the RF delay as the relative position of the UE 102 changes in respect to a corresponding eNB 160. In this manner, the eNB 160 may provide that all signals from UEs to the eNB 160 reach the eNB 160 at approximately the same time or within a cyclic prefix in an orthogonal frequency division multiplexing (OFDM) symbol. One configuration of timing advance commands 761 is given as follows.

In the case of a random access response, an 11-bit timing advance command $T_A$ 761 may indicate $N_{TA}$ values by index values of $T_A=0, 1, 2, \ldots, 1282$, where an amount of the time alignment is given by $N_{TA}=T_A \times 16$.

In other cases, a six-bit timing advance command $T_A$ 761 may indicate adjustment of a current $N_{TA}$ value (denoted $N_{TA,old}$) to a new $N_{TA}$ value (denoted $N_{TA,new}$) by index values of $T_A=0, 1, 2, \ldots, 63$, where $N_{TA,new}=N_{TA,old}+(T_A-31)\times16$. In this case, adjustment of an $N_{TA}$ value by a positive or a negative amount indicates advancing or delaying the uplink transmission timing by a given amount, respectively.

The group scheduling module 792 may be used to schedule communications for one or more groups of cells 119, 121. For example, the group scheduling block/module 792 may generate multi-group control information 763 that allocates communication resources to the UE 102 by sending a random access response to the UE 102. This may be done in response to a group communication request 751 (e.g., random access request). In some instances, scheduling information (e.g., multi-group control information 763) may be sent to the UE 102 using a PDCCH.

For example, a PDCCH (including multi-group control information 763, for instance) to schedule system information or paging information may be transmitted by an eNB 160. The physical layer of a UE 102 may be configured by higher layers with a RNTI. Multi-group (downlink) control information 763 that is conveyed by PDCCH may have attached CRC. The eNB 160 may scramble the CRC using the RNTI. For example, the CRC may be XORed with the RNTI. The RA-RNTI and the temporary C-RNTI may be used for PDCCH random access-related scheduling information.

In one configuration, a PSCell may not be cross-carrier scheduled. This means that other cells may not schedule a PSCell. On the other hand, a PSCell may schedule other cells. Thus, for example, the eNB 160 may use multi-group configuration information 763 to schedule one or more SCells and/or a PSCell using the PSCell. However, the eNB 160 may not schedule a PSCell using a separate SCell.

The group path loss module 790 may be used to manage one or more path loss parameters for one or more non-PCell groups. For example, in the case that an SCell 121 belongs to a non-PCell group, the group path loss module 790 may generate one or more path loss parameters 765 (e.g., pathlossReference-r11(psCell, sCell)) in order to designate a non-PCell group cell 121 as a path loss reference instead of a typical path loss parameter (e.g., pathlossReference-r10 (pCell, sCell)). The one or more path loss parameters 765 may be transmitted to the UE 102. The path loss parameter 765 may designate a cell used by a UE 102 to measure a path loss.

The group PUCCH module 784 may be used to generate PUCCH configuration information 767 that allocates one or more PUCCHs corresponding to one or more non-PCell groups. For example, a PSCell 121 may have a PUCCH in addition to a PUCCH corresponding to the PCell 119. Typically, a PUCCH may be allowed to be assigned only to a PCell 119 because of uplink transmission power mitigation. However, if the UE 102 is configured with multiple uplink time alignments, an eNB 160 may allocate the PUCCH in a PSCell 121 by sending PUCCH configuration information 767 to the UE 102.

The group HARQ module 788 may receive one or more ACK/NACKs 755 for one or more non-PCell groups. An eNB 160 may use the one or more ACK/NACKs 755 to retransmit information that was not correctly received by the UE 102. For example, the group HARQ module 788 may generate retransmission information 769. The retransmission information 769 may specify data to be retransmitted to the UE 102.

ACK/NACKs 755 corresponding to non-PCell group cells 121 in a group may be received by the eNB 160 on the PSCell 121 in the group. ACK/NACK(s) 755 may optionally be mapped to a PUCCH in a PSCell 121. In some configurations, HARQ-ACK(s) 755 corresponding to cells 119, 121 in a group may be received on a PCell 119 or a PSCell 121 in the group.

Figure 8:
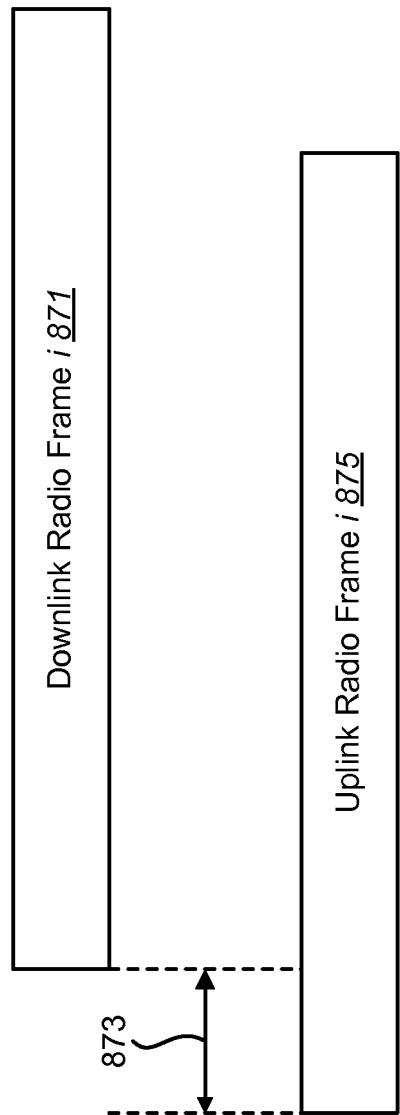
FIG. 8 is a diagram illustrating one example of uplink transmission timing.

FIG. 8 is a diagram illustrating one example of uplink transmission timing. Transmission of an uplink radio frame number i 875 from the UE 102 may start $N_{TA} \times T_s$ seconds 873 before the start of a corresponding downlink radio frame i 871 at the UE 102, where $0 \leq N_{TA} \leq 20512$ and $$T_s = \frac{1}{(15000 \times 2048)}$$

seconds. In other words, a UE 102 may begin transmitting an uplink radio frame i 875 $N_{TA} \times T_s$ seconds 873 before receiving a corresponding downlink radio frame i 871.

Figure 9:
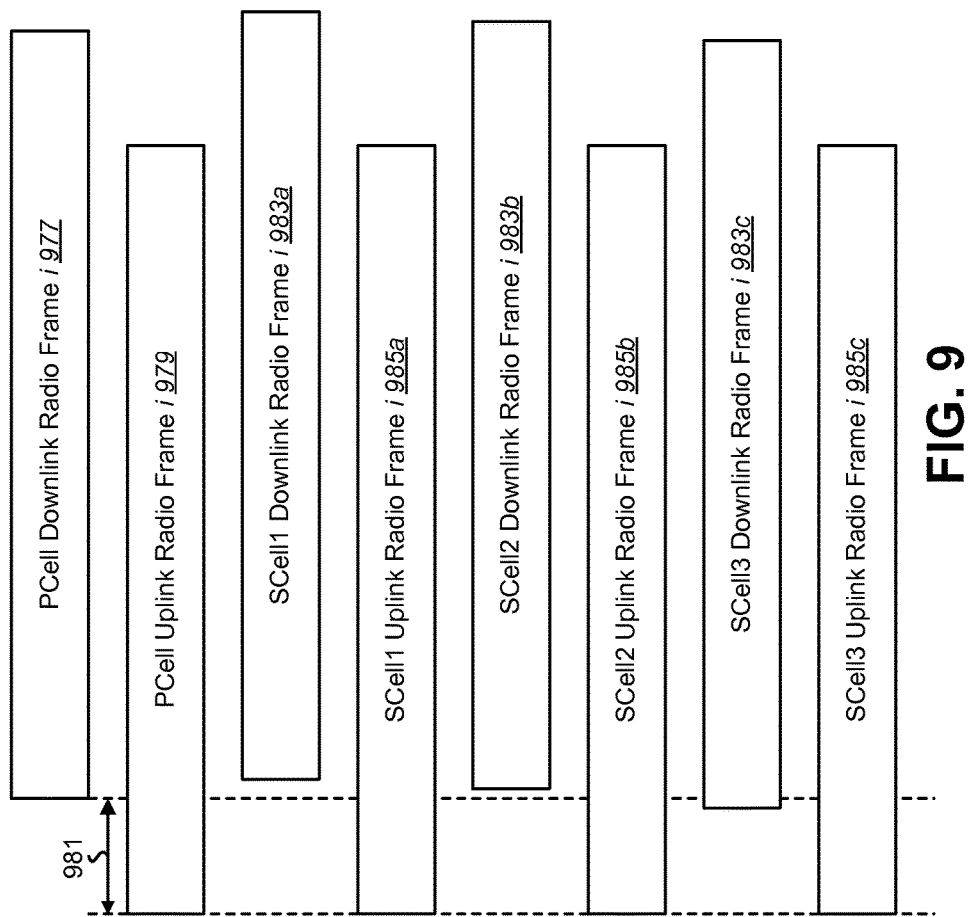
FIG. 9 is a diagram illustrating another example of uplink transmission timing.

FIG. 9 is a diagram illustrating another example of uplink transmission timing. The uplink transmission timing of one or more SCells (e.g., for PUSCH and/or SRS) is the same as the PCell. As illustrated in FIG. 9, the transmission of a PCell uplink radio frame number i 979 from the UE 102 may start $N_{TA} \times T_s$ seconds 981 before the start of a corresponding PCell downlink radio frame i 977 at the UE 102. The transmission of one or more SCell uplink radio frames number i 985a-c from the UE 102 may start $N_{TA} \times T_s$ seconds 981 before the start of the PCell downlink radio frame i 977 at the UE 102. As can be observed in FIG. 9, downlink radio frames number i 983a-c may vary in timing.

Figure 10:
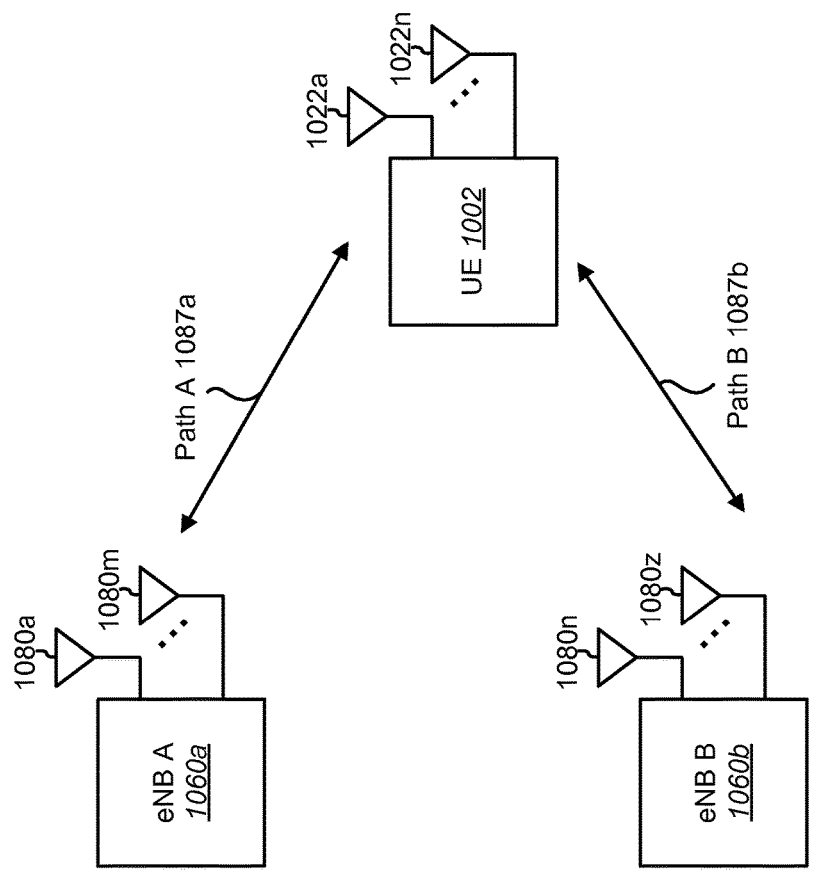
FIG. 10 is a block diagram illustrating one example of a deployment scenario.

FIG. 10 is a block diagram illustrating one example of a deployment scenario. In this example, two eNBs 1060a-b may both communicate with a UE 1002. eNB A 1060a may include one or more antennas 1080a-m for communicating with the UE 1002. eNB B 1060b may include one or more antennas 1080n-z for communicating with the UE 1002. The UE 1002 may include antennas 1022a-n for communicating with eNB A 1060a and eNB B 1060b. In this example, the UE 1002 may communicate with two non-collocated sites (e.g., eNBs 1060a-b) on multiple carriers. As can be observed, each communication path 1087a-b may experience different propagation environments. This may lead to differences in uplink transmission timing for communication frames on path A 1087a and path B 1087b. In one configuration, one group of cells or channels may be established on path A 1087a, while another group of cells or channels may be established on path B 1087b. The scenario illustrated in FIG. 10 could similarly occur with remote antennas or remote radio heads.

Figure 11:
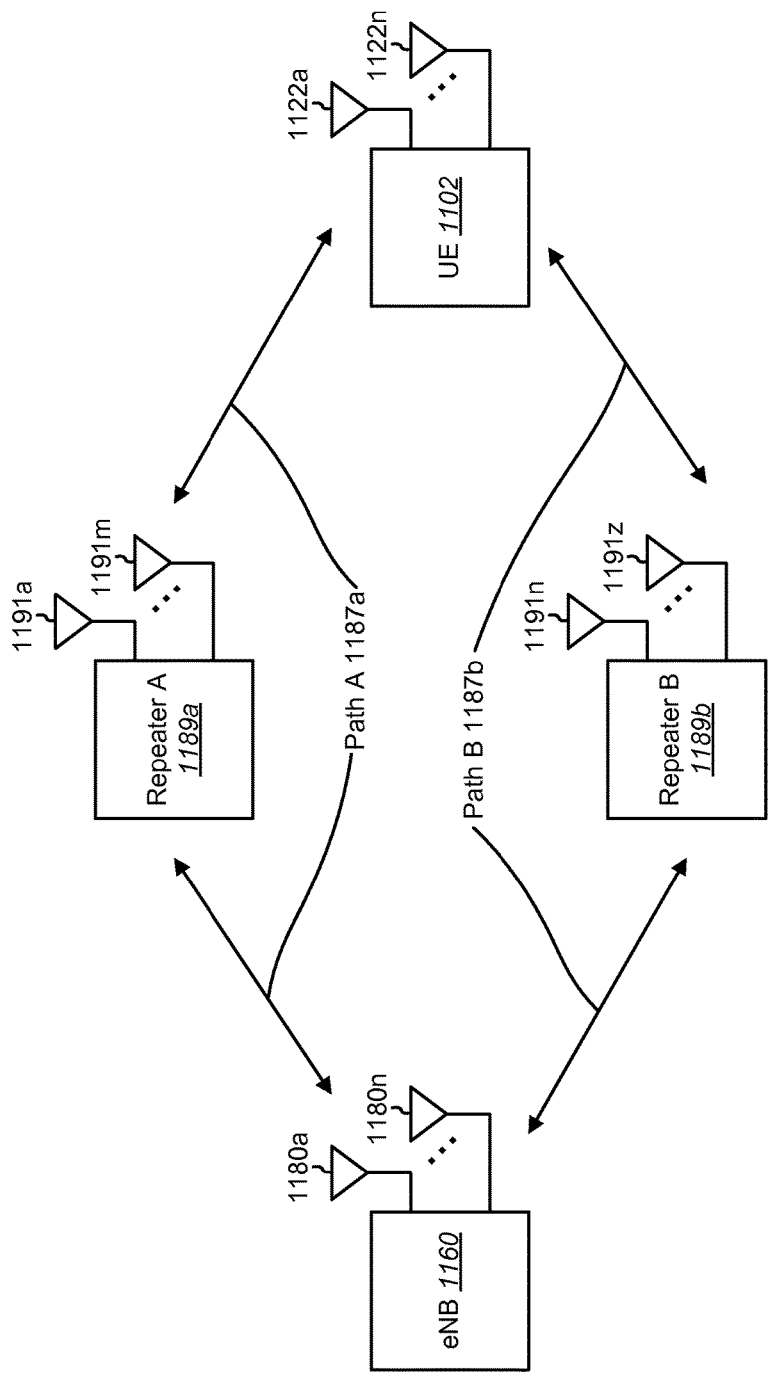
FIG. 11 is a block diagram illustrating another example of a deployment scenario.

FIG. 11 is a block diagram illustrating another example of a deployment scenario. In this example, an eNB 1160 may communicate with a UE 1102 using multiple signals. The eNB 1160 may include one or more antennas 1180a-n for communicating with the UE 1102 via repeaters A and B 1189a-b. Repeater A 1189a may include one or more antennas 1191 a-m for communicating with the eNB 1160 and/or the UE 1102. Repeater B 1189b may include one or more antennas 1191n-z for communicating with the eNB 1160 and/or the UE 1102. The UE 1102 may include antennas 1122a-n for communicating with the eNB 1160 via repeaters A and B 1189a-b. In this example, the UE 1102 may communicate with the eNB 1160 over paths A and B 1187a-b. As can be observed, each communication path 1187a-b may experience different propagation environments. This may lead to differences in uplink transmission timing for communication frames on path A 1187a and path B 1187b. For example, different component carriers could see substantially different propagation environments between path A 1187a and path B 1187b due to different frequency-selective repeaters 1189a-b and hence experience different time-of-flights. In one configuration, one group of cells or channels may be established on path A 1187a, while another group of cells or channels may be established on path B 1187b.

Figure 12:
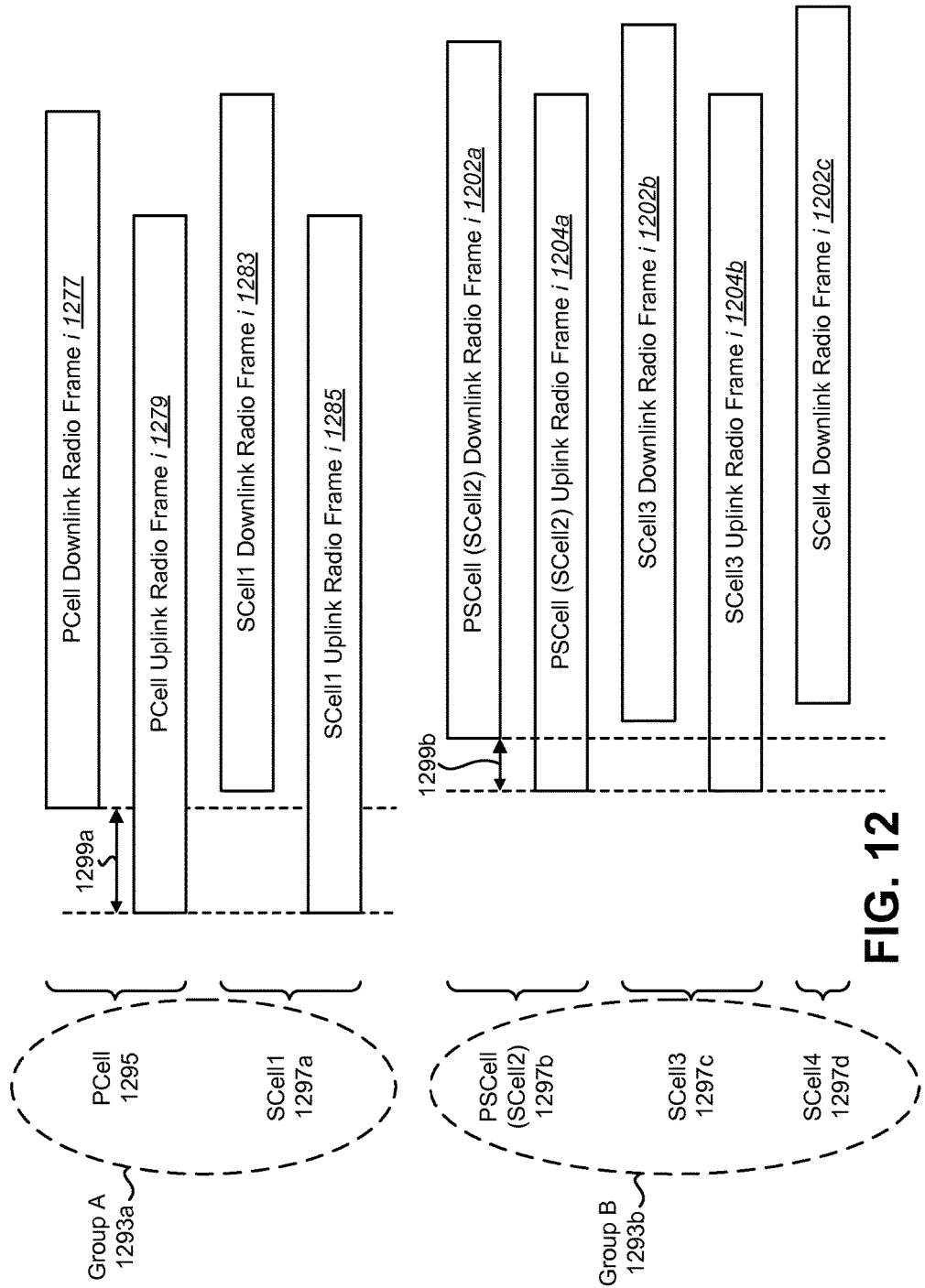
FIG. 12 is a diagram illustrating one example of uplink transmission timing with multiple cell groups.

FIG. 12 is a diagram illustrating one example of uplink transmission timing with multiple cell groups 1293a-b. In this example, it can be observed that group A 1293a includes a PCell 1295 and SCell1 1297a. Furthermore, group B 1293b includes a PSCell (e.g., SCell2) 1297b, SCell3 1297c and SCell4 1297d. For group A 1293a, the uplink transmission timing 1299a (for a PUSCH and/or SRS, for example) of SCell1 1297a may be the same as the uplink transmission timing 1299a for a corresponding PCell 1295 in group A 1293a. More specifically, the uplink transmission timing 1299a for SCell1 uplink radio frame i 1285 may be aligned (e.g., adjusted to approximately match) the uplink transmission timing 1299a of the PCell uplink radio frame i 1279. As illustrated in FIG. 12, the transmission timing 1299a of the PCell uplink radio frame i 1279 is based on the PCell downlink radio frame i 1277. The timing for the SCell1 downlink radio frame i 1283 may vary.

For group B 1293b, the uplink transmission timing 1299b (for a PUSCH and/or SRS, for example) of SCell3 1297c may be the same as the uplink transmission timing 1299b for the corresponding PSCell (SCell2) 1297b in group B 1293b. More specifically, the uplink transmission timing 1299b for SCell3 uplink radio frame i 1204b may be aligned (e.g., adjusted to approximately match) the uplink transmission timing 1299b of the PSCell (SCell2) uplink radio frame i 1204a. As illustrated in FIG. 12, the transmission timing 1299b of the PSCell (SCell2) uplink radio frame i 1204a is based on the PSCell (SCell2) downlink radio frame i 1202a. The timing for the SCell3 downlink radio frame i 1202b and the SCell4 downlink radio frame i 1202c may vary. As illustrated in FIG. 12, a multiple serving cell concept may be that each serving cell 1295, 1297a-d has a respective downlink 1277, 1283, 1202a-c and may optionally have a respective uplink 1279, 1285, 1204a-b. Each serving downlink carrier and uplink carrier may belong to one serving cell 1295, 1297a-d.

FIG. 13 is a diagram illustrating one example of uplink transmission timing adjustments 1318, 1320 in random access responses 1314, 1316. In this example, two groups 1393a-b are illustrated. Group A 1393a includes a PCell downlink 1306, PCell uplink 1308, SCell1 downlink 1310a and SCell1 uplink 1312a. The PCell downlink 1306 includes a random access response 1314 that is used for a timing adjustment 1318 on the PCell uplink 1308 and SCell1 uplink 1312a.

In this example, group B 1393b includes a PSCell (SCell2) downlink 1310b, a PSCell (SCell2) uplink 1312b, SCell3 downlink 1310c, SCell3 uplink 1312c and SCell4 downlink 1310d. The PSCell (SCell2) downlink 1310b includes a random access response 1316 that is used for a timing adjustment 1320 on the PSCell (SCell2) uplink 1312b and SCell3 uplink 1312c.

A timing advance command in a random access response 1314, 1316 may be transmitted from an eNB 160 to a UE 102 in a PCell 1306 or in a PSCell 1310b after the UE 102 has sent a random access preamble in the PCell 1306 or the PSCell 1310b. Random access responses 1314, 1316 may be scheduled by a PDCCH including a random access radio network temporary identifier (RA-RNTI), which is an identifier used for scheduling a PDSCH including a random access response 1314, 1316.

The PCell uplink 1308 or SCell uplink 1312a-c that a received random access response 1314, 1316 corresponds to may be distinguished according to which serving or downlink cell 1306, 1310a-d the random access response 1314, 1316 is scheduled in. For example, a UE may determine which cell uplink 1308, 1312a-c corresponds to a received random access response 1314, 1316 by determining which serving cell downlink 1306, 1310b the random access response 1314, 1316 is scheduled in. A serving cell downlink 1306, 1310b that the random access response 1314, 1316 is scheduled in may be determined by identifying a cell downlink 1306, 1310b that has a HARQ entity, a PDCCH or a PDSCH for a random access response. The random access response 1314 scheduled in a PCell downlink 1306 may be used for an uplink transmission timing adjustment 1318 for a PCell uplink 1308 and for any other SCell(s) 1312a in the same group 1393a. The random access response 1316 scheduled in a PSCell downlink 1310b may be used for an uplink transmission timing adjustment 1320 for a PSCell uplink 1312b and any other SCell(s) 1312c in the same group 1393b.

Figure 14:
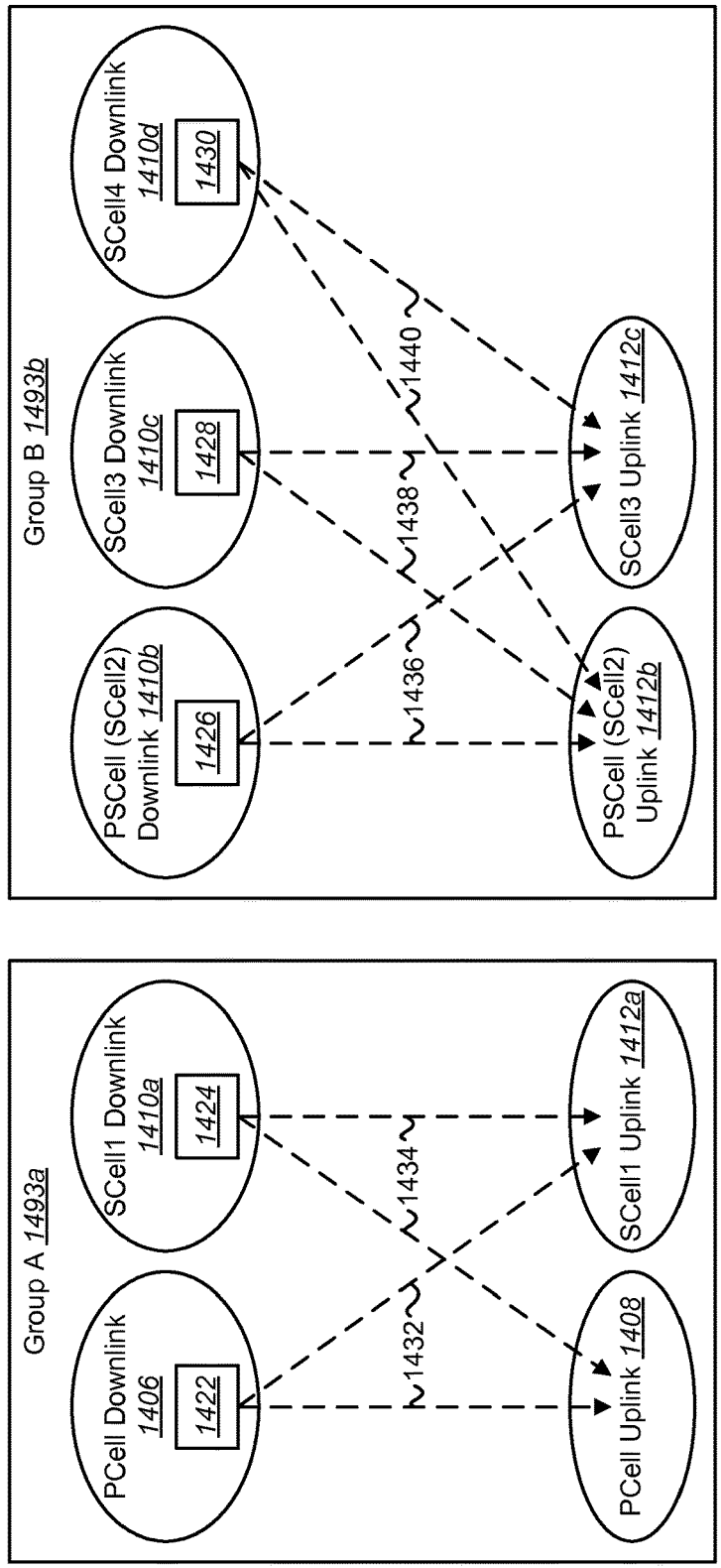
FIG. 14 is a diagram illustrating one example of uplink transmission timing adjustments from timing advance command media access control (MAC) control elements.

FIG. 14 is a diagram illustrating one example of uplink transmission timing adjustments 1432, 1434, 1436, 1438, 1440 from timing advance command MAC control elements 1422, 1424, 1426, 1428, 1430. In this example, two groups 1493a-b are illustrated. Group A 1493a includes a PCell downlink 1406, PCell uplink 1408, SCell1 downlink 1410a and SCell1 uplink 1412a. The PCell downlink 1406 includes a timing advance command MAC control element 1422 that may be used for a timing adjustment 1432 on the PCell uplink 1408 and SCell1 uplink 1412a. SCell1 downlink 1410a includes a timing advance command MAC control element 1424 that may be used for a timing adjustment 1434 on the PCell uplink 1408 and SCell1 uplink 1412a.

In this example, group B 1493b includes a PSCell (SCell2) downlink 1410b, a PSCell (SCell2) uplink 1412b, SCell3 downlink 1410c, SCell3 uplink 1412c and SCell4 downlink 1410d. The PSCell (SCell2) downlink 1410b includes a timing advance command MAC control element 1426 that may be used for a timing adjustment 1436 on the PSCell (SCell2) uplink 1412b and SCell3 uplink 1412c. SCell3 downlink 1410c includes a timing advance command MAC control element 1428 that may be used for a timing adjustment 1438 on the PSCell (SCell2) uplink 1412b and SCell3 uplink 1412c. SCell4 downlink 1410d includes a timing advance command MAC control element 1430 that may be used for a timing adjustment 1440 on the PSCell (SCell2) uplink 1412b and SCell3 uplink 1412c.

A timing advance command MAC control element 1422, 1424, 1426, 1428, 1430 may be transmitted from an eNB 160 to the UE 102 at any time the eNB 160 wants to change the UE's 102 uplink transmission timing. Whether the received timing advance command MAC control element 1422, 1424, 1426, 1428, 1430 is for the PCell 1408 or for a PSCell 1412b may be distinguished based on which serving cell downlink 1406, 1410a-d the timing advance command MAC control element is scheduled in. A serving cell downlink 1406, 1410a-d that the timing advance command MAC control element 1422, 1424, 1426, 1428, 1430 is scheduled in may be determined by identifying a cell downlink 1406, 1410a-d that has a HARQ entity, a PDCCH or a PDSCH for a timing advance command MAC control element 1422, 1424, 1426, 1428, 1430. A timing advance command MAC control element 1422, 1424 scheduled in any serving cell downlink 1406, 1410a in a group 1493a that includes the PCell downlink 1406 may be used for an uplink transmission timing adjustment 1432, 1434 for the PCell uplink 1408 and for any SCell uplink(s) 1412a in the same group 1493a. A timing advance command MAC control element 1426, 1428, 1430 scheduled in any serving cell downlink 1410b-d in the group 1493b that includes the PSCell downlink 1410b may be used for an uplink transmission timing adjustment 1436, 1438, 1440 for the PSCell uplink 1412b and for any other SCell uplink(s) 1412c in the same group 1493b. In another configuration, a MAC header of the timing advance command MAC control element 1422, 1424, 1426, 1428, 1430 may indicate which group 1493a-b the command corresponds to.

FIG. 15 is a diagram illustrating one example of common space monitoring in multiple groups 1593a-b. In this example, two groups 1593a-b are illustrated. Group A 1593a includes a PCell downlink 1506, PCell uplink 1508, SCell1 downlink 1510a and SCell1 uplink 1512a. The PCell downlink 1506 includes a common search space 1542. The PCell uplink 1508 includes a random access channel (RACH) 1546 and/or a physical uplink control channel (PUCCH) 1548.

In this example, group B 1593b includes a PSCell (SCell2) downlink 1510b, a PSCell (SCell2) uplink 1512b, SCell3 downlink 1510c, SCell3 uplink 1512c and SCell4 downlink 1510d. The PSCell (SCell2) downlink 1510b includes a common search space 1544. The PSCell (SCell2) uplink 1512b includes a RACH 1550 and/or a PUCCH 1552.

Typically, there is only one common search space in a PCell and there is no common search space in an SCell. However, according to the systems and methods disclosed herein, multiple common search spaces 1542, 1544 may be used. A UE 102 may monitor a set of PDCCH candidates for control information on one or more activated serving cell downlinks 1506, 1510a-d as configured by higher layer signaling. More than one serving cell may be configured by RRC signaling and a serving cell may be activated or deactivated by MAC signaling.

The set of PDCCH candidates to monitor may be defined in terms of search spaces. There is a common search space 1542 on the PCell downlink 1506 and a UE-specific search space on the PCell downlink 1506 and/or one or more SCell downlinks 1510a-d. Although the common search space 1542 may typically be cell specific and only on the PCell downlink 1506, multiple common search spaces 1542, 1544 may be used and a common search space 1544 may be defined on a PSCell 1510b (e.g., SCell2) in accordance with the systems and methods disclosed herein. A UE-specific search space may be defined by a cell radio network temporary identifier or C-RNTI (e.g., user equipment identifier (UEID)) and may be prepared for each serving cell downlink 1506, 1510a-d.

Different kinds of information or data may be transmitted in a common search space 1542, 1544. For example, a PDCCH to schedule system information or paging information, random access related information or normal UE data may be transmitted in the common search spaces 1542, 1544. The physical layer of a UE 102 may be configured by higher layers with a RNTI. The UE 102 may decode the PDCCH with a cyclic redundancy check (CRC) scrambled by the RNTI. Downlink control information that is conveyed by PDCCH may have attached CRC. The CRC may be scrambled by the RNTI. For example, the CRC may be XORed with the RNTI. Some examples of the radio network temporary identifier (RNTI) include system information RNTI (SI-RNTI), paging RNTI (P-RNTI), cell RNTI (C-RNTI), random access RNTI (RA-RNTI), semi-persistent scheduling C-RNTI (SPS C-RNTI), temporary C-RNTI, transmit power control physical uplink control channel RNTI (TPC-PUCCH-RNTI) and transmit power control physical uplink shared channel RNTI (TPC-PUSCH-RNTI). In some cases, the UE 102 may monitor the RNTI (if it is configured to be monitored, for example). The RA-RNTI and the temporary C-RNTI may be used for PDCCH random access-related scheduling information.

In order to have multiple time alignments, a UE 102 may need to perform a random access procedure in a PSCell uplink 1512b. Thus, a UE 102 configured with an SCell 1512b with a RACH 1550 may be required to monitor a PDCCH in the common search space 1544 in the PSCell downlink 1510b in addition to the common search space 1542 in the PCell downlink 1506. There may be no need to monitor a SI-RNTI, a P-RNTI and an SPS C-RNTI in the PSCell, since it may be sufficient to monitor them in the common search space 1542 in the PCell downlink 1506. Therefore, the C-RNTI, RA-RNTI, temporary C-RNTI, TPC-PUCCH-RNTI and TPC-PUSCH-RNTI may be monitored by the UE 102 in the common search space 1544 in a PSCell downlink 1510*b*.

In accordance with the systems and methods disclosed herein, multiple PUCCHs 1548, 1552 may be used. For example, a PUCCH 1548 may be configured in a PCell uplink 1508 and a PUCCH 1552 may be configured in a PSCell uplink 1512*b* (as allocated by an eNB 160, for example).

Figure 16:
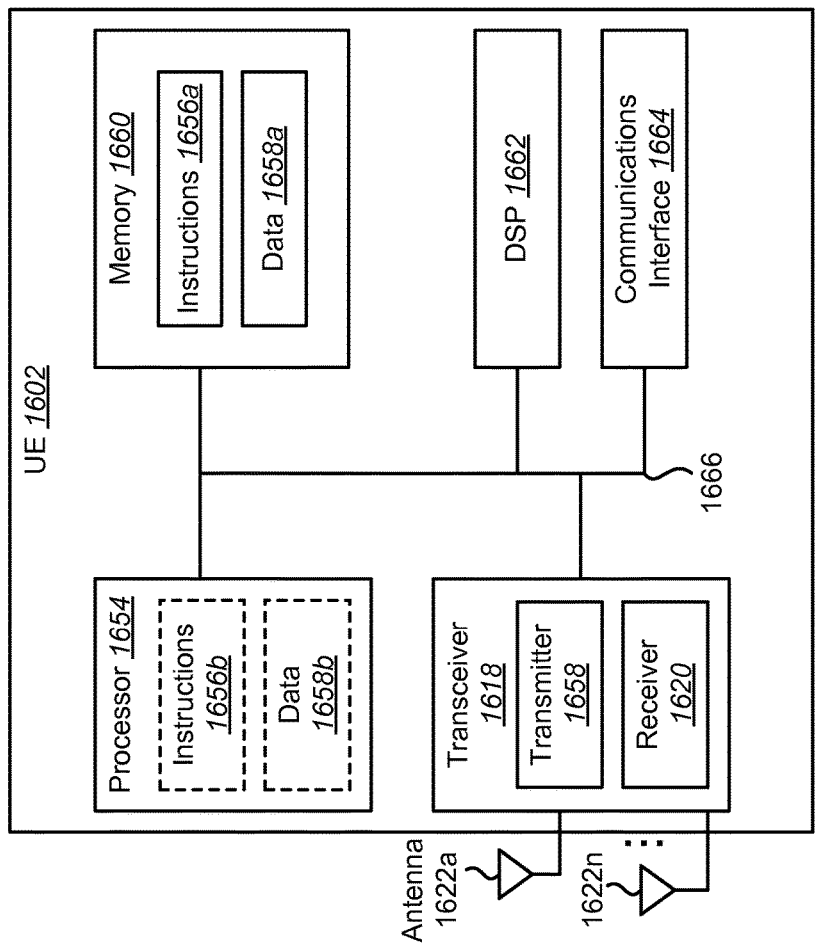
FIG. 16 illustrates various components that may be utilized in a user equipment (UE)

FIG. 16 illustrates various components that may be utilized in a User Equipment (UE) 1602. The UE 1602 may be utilized as the UEs 102, 1002, 1102 described above. The UE 1602 includes a processor 1654 that controls operation of the UE 1602. The processor 1654 may also be referred to as a CPU. Memory 1660, which may include read-only memory (ROM), random access memory (RAM), a combination of the two or any type of device that may store information, provides instructions 1656*a* and data 1658*a* to the processor 1654. A portion of the memory 1660 may also include non-volatile random access memory (NVRAM). Instructions 1656*b* and data 1658*b* may also reside in the processor 1654. Instructions 1656*b* and/or data 1658*b* loaded into the processor 1654 may also include instructions 1656*a* and/or data 1658*a* from memory 1660 that were loaded for execution or processing by the processor 1654. The instructions 1656*b* may be executed by the processor 1654 to implement the systems and methods disclosed herein.

The UE 1602 may also include a housing that contains one or more transmitters 1658 and one or more receivers 1620 to allow transmission and reception of data. The transmitter(s) 1658 and receiver(s) 1620 may be combined into one or more transceivers 1618. One or more antennas 1622*a-n* are attached to the housing and electrically coupled to the transceiver 1618.

The various components of the UE 1602 are coupled together by a bus system 1666, which may include a power bus, a control signal bus, and a status signal bus, in addition to a data bus. However, for the sake of clarity, the various buses are illustrated in FIG. 16 as the bus system 1666. The UE 1602 may also include a digital signal processor (DSP) 1662 for use in processing signals. The UE 1602 may also include a communications interface 1664 that provides user access to the functions of the UE 1602. The UE 1602 illustrated in FIG. 16 is a functional block diagram rather than a listing of specific components.

Figure 17:
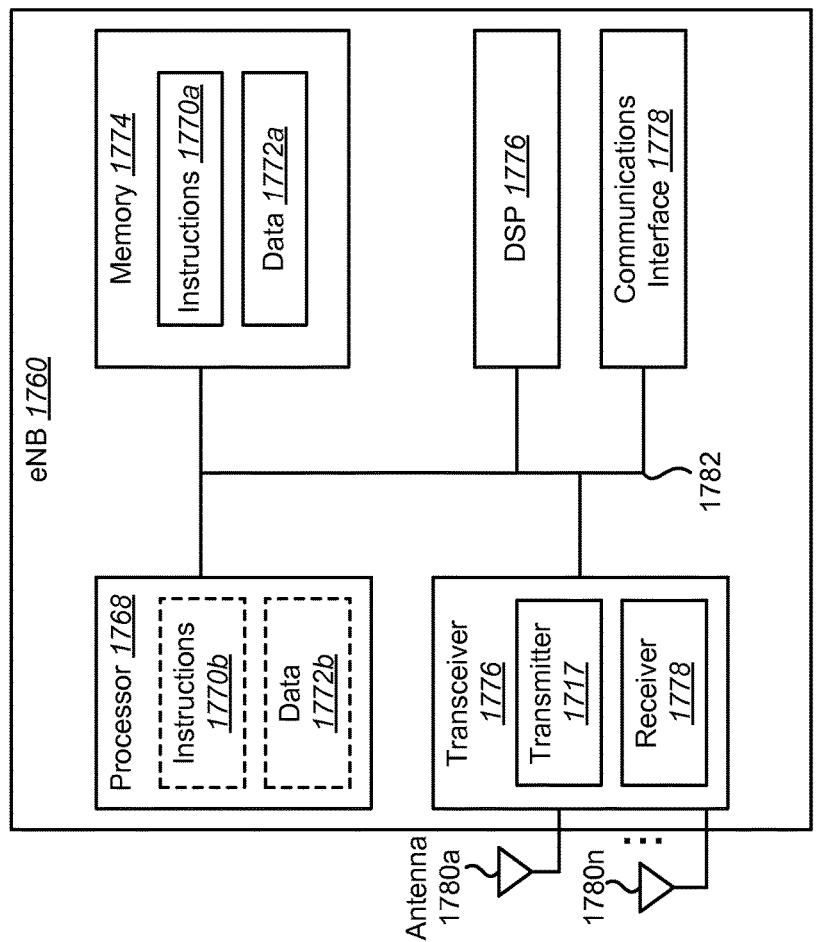
FIG. 17 illustrates various components that may be utilized in an evolved Node B (eNB).

FIG. 17 illustrates various components that may be utilized in an evolved Node B (eNB) 1760. The eNB 1760 may be utilized as one or more of the eNBs 160, 1060, 1160 illustrated previously. The eNB 1760 may include components that are similar to the components discussed above in relation to the UE 1602, including a processor 1768, memory 1774 that provides instructions 1770*a* and data 1772*a* to the processor 1768, instructions 1770*b* and data 1772*b* that may reside in or be loaded into the processor 1768, a housing that contains one or more transmitters 1717 and one or more receivers 1778 (which may be combined into one or more transceivers 1776), one or more antennas 1780*a-n* electrically coupled to the transceiver(s) 1776, a bus system 1782, a DSP 1776 for use in processing signals, a communications interface 1778 and so forth.

The term "computer-readable medium" refers to any available medium that can be accessed by a computer or a processor. The term "computer-readable medium," as used herein, may denote a computer- and/or processor-readable medium that is non-transitory and tangible. By way of example, and not limitation, a computer-readable or processor-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer or processor. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

It should be noted that one or more of the methods described herein may be implemented in and/or performed using hardware. For example, one or more of the methods described herein may be implemented in and/or realized using a chipset, an application-specific integrated circuit (ASIC), a large-scale integrated circuit (LSI) or integrated circuit, etc.

Each of the methods disclosed herein comprises one or more steps or actions for achieving the described method. The method steps and/or actions may be interchanged with one another and/or combined into a single step without departing from the scope of the claims. In other words, unless a specific order of steps or actions is required for proper operation of the method that is being described, the order and/or use of specific steps and/or actions may be modified without departing from the scope of the claims.

It is to be understood that the claims are not limited to the precise configuration and components illustrated above. Various modifications, changes and variations may be made in the arrangement, operation and details of the systems, methods, and apparatus described herein without departing from the scope of the claims.

What is claimed is:

1. A User Equipment (UE) comprising:
a computer processor;
a memory in electronic communication with the computer processor;
instructions stored in the memory, the instructions being executable by the computer processor to:
receive a radio resource control (RRC) message including a configuration to configure multiple groups, each of which is constituted by one or more serving cells; wherein
a cell configured with a physical uplink control channel (PUCCH), which is included in one group of the multiple groups, is a primary cell (PCell), and
a cell configured with a PUCCH, which is included in another group of the multiple groups, is a primary secondary cell (PSCell),
one or more hybrid automatic repeat request acknowledgements (HARQ-ACK(s)) for the one group are mapped to the PUCCH on the PCell and one or more hybrid automatic repeat request acknowledgements (HARQ-ACK(s)) for the another group are mapped to the PUCCH on the PSCell.

2. A base station comprising:
a computer processor;
a memory in electronic communication with the computer processor;
instructions stored in the memory, the instructions being executable by the computer processor to:

transmit a radio resource control (RRC) message including a configuration to configure multiple groups, each of which is constituted by one or more serving cells; wherein a cell configured with a physical uplink control channel (PUCCH), which is included in one group of the multiple groups, is a primary cell (PCell), and a cell configured with a PUCCH, which is included in another group of the multiple groups, is a primary secondary cell (PSCell), one or more hybrid automatic repeat request acknowledgements (HARQ-ACK(s)) for the one group are mapped to the PUCCH on the PCell and one or more hybrid automatic repeat request acknowledgements (HARQ-ACK(s)) for the another group are mapped to the PUCCH on the PSCell.

3. A method performed by a User Equipment (UE) comprising:

receiving, from a base station a radio resource control (RRC) message including a configuration to configure multiple groups, each of which is constituted by one or more serving cells; wherein a cell configured with a physical uplink control channel (PUCCH), which is included in one group of the multiple groups, is a primary cell (PCell), and a cell configured with a PUCCH, which is included in another group of the multiple groups, is a primary secondary cell (PSCell), one or more hybrid automatic repeat request acknowledgements (HARQ-ACK(s)) for the one group are mapped to the PUCCH on the PCell and one or more hybrid automatic repeat request acknowledgements (HARQ-ACK(s)) for the another group are mapped to the PUCCH on the PSCell.

4. A method performed by a base station comprising:

transmitting, to a user equipment (UE), a radio resource control (RRC) message including a configuration to configure multiple groups, each of which is constituted by one or more serving cells; wherein a cell configured with a physical uplink control channel (PUCCH), which is included in one group of the multiple groups, is a primary cell (PCell), and a cell configured with a PUCCH, which is included in another group of the multiple groups, is a primary secondary cell (PSCell), one or more hybrid automatic repeat request acknowledgements (HARQ-ACK(s)) for the one group are mapped to the PUCCH on the PCell and one or more hybrid automatic repeat request acknowledgements (HARQ-ACK(s)) for the another group are mapped to the PUCCH on the PSCell.

5. The User Equipment (UE) of claim 1, further comprising instructions being executable by the computer processor to receive an RRC message indicating the PSCell.

6. The base station of claim 2, further comprising instructions being executable by the computer processor to transmit an RRC message indicating the PSCell.

7. The method of claim 3, further comprising receiving an RRC message indicating the PSCell.

8. The method of claim 4, further comprising transmitting an RRC message indicating the PSCell.

* * * * *